(12) United States Patent
Choi et al.

(10) Patent No.: US 12,490,363 B2
(45) Date of Patent: Dec. 2, 2025

(54) LIGHTING DEVICE, AND METHOD AND SYSTEM FOR CONTROLLING THE SAME

(71) Applicant: HYBE Co., Ltd., Seoul (KR)

(72) Inventors: Bo Yoon Choi, Seoul (KR); Sung Joo Jeong, Seoul (KR); Hyeong Gu Kim, Seoul (KR); Da Hye Seo, Seoul (KR)

(73) Assignee: HYBE CO., LTD., Seoul (KR)

( * ) Notice: Subject to any disclaimer, the term of this patent is extended or adjusted under 35 U.S.C. 154(b) by 231 days.

(21) Appl. No.: 18/344,639

(22) Filed: Jun. 29, 2023

(65) Prior Publication Data

US 2024/0008157 A1    Jan. 4, 2024

(30) Foreign Application Priority Data

Jul. 4, 2022    (KR) .................... 10-2022-0081748

(51) Int. Cl.
| | |
|---|---|
| *H05B 47/155* | (2020.01) |
| *H05B 47/115* | (2020.01) |
| *H05B 47/165* | (2020.01) |
| *H05B 47/18*  | (2020.01) |

(52) U.S. Cl.
CPC ......... *H05B 47/165* (2020.01); *H05B 47/115* (2020.01); *H05B 47/155* (2020.01); *H05B 47/18* (2020.01)

(58) Field of Classification Search
CPC .. H05B 47/165; H05B 47/115; H05B 47/155; H05B 47/18; H05B 47/1975; H05B 47/1965; H05B 47/197; H05B 47/1985; H05B 47/19; Y02B 20/40
USPC .......................................................... 315/307
See application file for complete search history.

(56) References Cited

U.S. PATENT DOCUMENTS

| | | | | |
|---|---|---|---|---|
| 10,398,009 B2* | 8/2019 | Noh | ........................ | H04L 67/55 |
| 10,893,597 B2* | 1/2021 | Choi | ........................ | H05B 47/19 |
| 11,350,509 B2* | 5/2022 | Kim | ........................ | H05B 47/19 |
| 11,452,192 B2* | 9/2022 | Kwon | ........................ | H05B 47/19 |

(Continued)

FOREIGN PATENT DOCUMENTS

| | | |
|---|---|---|
| EP | 3 726 491 | 10/2020 |
| JP | 2010-192155 | 9/2010 |

(Continued)

*Primary Examiner* — Ryan Jager
(74) *Attorney, Agent, or Firm* — KILE PARK REED & HOUTTEMAN PLLC

(57) ABSTRACT

Provided are a lighting device and a method for controlling the same. The method for controlling the lighting device by a directing application executed by at least one processor of a director terminal, the method includes creating a library which defines light emitting patterns for a plurality of lighting devices, creating a scenario which defines the light emitting patterns for the plurality of lighting devices for a predetermined time, creating a performance preparation data including at least one of the library and the scenario, providing the created performance preparation data to the plurality of lighting devices, transmitting, to the plurality of lighting devices, a lighting device control signal instructing execution, suspension, or termination of a t least one of the library and the scenario included in the provided performance preparation data, and implementing an integrated lighting control performance according to the transmitted lighting device control signal.

12 Claims, 14 Drawing Sheets

(56) References Cited

U.S. PATENT DOCUMENTS

| | | | |
|---|---|---|---|
| 11,606,854 B2 | 3/2023 | Kim et al. | |
| 11,638,338 B2 | 4/2023 | Choi et al. | |
| 11,678,423 B2 | 6/2023 | Kwon et al. | |
| 11,974,381 B2* | 4/2024 | Choi | H05B 47/1965 |
| 2019/0037671 A1* | 1/2019 | Noh | H05B 47/1985 |
| 2019/0394860 A1* | 12/2019 | Choi | H05B 45/20 |
| 2021/0076471 A1* | 3/2021 | Kwon | G06F 3/1446 |
| 2021/0076472 A1 | 3/2021 | Kim et al. | |
| 2021/0084737 A1* | 3/2021 | Choi | H05B 47/19 |
| 2022/0124898 A1* | 4/2022 | Choi | A63J 5/02 |
| 2022/0264733 A1* | 8/2022 | Choi | H05B 47/155 |
| 2022/0386437 A1* | 12/2022 | Kwon | G06F 3/1423 |
| 2022/0400545 A1 | 12/2022 | Kim et al. | |
| 2023/0209674 A1* | 6/2023 | Choi | H05B 45/20 |
| | | | 315/152 |

FOREIGN PATENT DOCUMENTS

| | | |
|---|---|---|
| JP | 2015-11981 | 1/2015 |
| JP | 2020-4703 | 1/2020 |
| JP | 2021-508147 | 2/2021 |
| KR | 10-0898494 | 5/2009 |
| KR | 10-2019-0001458 | 1/2019 |
| KR | 10-2019-0013111 | 2/2019 |
| KR | 10-1970358 | 4/2019 |
| KR | 10-2019-0070220 | 6/2019 |
| KR | 10-2021-0043510 | 4/2021 |
| KR | 10-2022-0057502 | 5/2022 |

* cited by examiner

FIG. 5

| Library Editor | | | | |
|---|---|---|---|---|
| | Tittle _____ | TimeCode 16:26:39/0 | | |
| | | LAS | | |
| 00:01:10:02 | Library 1 ├┼┼┼┼┼┼┼┼┼┼┼┼┼┼┼┼┼┼┼┼┼┼┼┼┼┼┼┼┼┼┼┼┼┤ | | | |
| Layer 1 | | | | |
| Irradiation on/off | on | on | on | on | on | on |
| Color | Blue | | | Red |
| Brightness | 2000lm | | | |
| Effect | Fade-in | | Fade-out | |
| PCI | Color : Red(PT) Effect : Blink(PR) ⋮ | | Color : Blue(PT) Effect : Gradation(PR) ⋮ | |
| | PCS | | PCS | |
| ⋮ | | ⋮ | | |

FIG. 11

| | | | | | | | | | | |
|---|---|---|---|---|---|---|---|---|---|---|
| Scenario Editor | | | | | | | | | | |
| Tittle _____ TimeCode 16:26:39/0 | | | | | | | | | | |
| 00:01:10:02 | ++++++++++++++++++++++++++++++++++++++++++++++++++++++++++++++++++++++++++++ | | | | | | | | | |
| Layer 1 | Scenario 1 | | | | Scenario 2 | | | Scenario 3 | | |
| Unit Library | Library 1 | Library 2 | Library 3 | ... | Library 1 | | ... | | | ... |
| SPI | | | | | SPI | | | SPI | | |
| PCI | Color Effect ⋮ | | Color Effect ⋮ | | Color Effect ⋮ | | | | | |
| ⋮ | ⋮ | | | | ⋮ | | | ⋮ | | |

LIGHTING DEVICE, AND METHOD AND SYSTEM FOR CONTROLLING THE SAME

CROSS-REFERENCE TO RELATED APPLICATIONS

This application claims priority under 35 U.S.C 119(a) to Korean Patent Application No. 10-2022-0081748, filed on Jul. 4, 2022 in the Korean Intellectual Property Office, the entire disclosure of which is incorporated herein by reference in its entirety.

TECHNICAL FIELD

The present invention relates to a lighting device and a method and system for controlling the same. More specifically, the present disclosure relates to a lighting device, and a method and system for controlling the same that create a library and/or scenario for controlling light emitting of a lighting device, and control the light emitting for a plurality of lighting devices based on the created library and/or scenario.

BACKGROUND

In general, in a performance hall, and a space such as concert and/or art gallery where a large number of people gather, a predetermined lighting device may be arranged for the purpose of guiding a performance, instructing movement in the space, or supporting aesthetics.

Here, the lighting device may refer to a device that an individual carries or is provided to an individual and emits light in various patterns.

The lighting device may be possessed by users who watch a corresponding performance, concert and/or exhibition in a predetermined space as described above, or may be provided by attaching to a seat of each of the users.

In particular, the lighting device provided to each individual may operate differently depending on a specific location or provided individual within the space. Recently, a controlling method for remotely controlling the lighting device to realize a specific shape or pattern as planned across a space is developed and used frequently in various fields.

For this purpose, it is necessary to transmit a control message to direct a different light emitting pattern for each lighting device. However, sending different control messages to numerous lighting devices one by one causes problems such as communication overload or synchronization errors.

In other words, in order for a large number of lighting devices arranged in a wide space to operate at once according to different light emitting patterns, it is necessary to control the corresponding lighting devices so that the lighting devices can operate simultaneously at the correct timing. However, a technology development for attaining this objective and result has not been done sufficiently.

Meanwhile, in the related art, in order to control the light emitting operation of the lighting device as described above, a library including data set in advance to make the lighting device operate in a specific light emitting pattern has been produced and used.

Alternatively, a scenario that controls the light emitting of the lighting device for a predetermined period of time by setting a combination of the library or a separate light emitting pattern has been used.

However, in the related art, the previously produced and created library and/or scenario, properties (for example, light emitting on/off, color, brightness and/or dynamic effect, or the like) of the corresponding light emitting pattern cannot be changed and can be used only as it is. In addition, when any change to the existing library or scenario is required, a new library and/or a new scenario should be newly created from the beginning.

In addition, because of the technical problem described above libraries and/or scenarios as many as the desired number of light emitting patterns should be created and stored one by one, which will cause several problems such as data overflow or memory efficiency degradation.

Therefore, it is required to develop and introduce a new technology to solve the above-mentioned problems.

SUMMARY

The present invention has been devised to solve the problems described above, and an object of the present invention provides a lighting device and a method and system for controlling the same that create a library and/or scenario for controlling light emitting of the lighting device and control light emitting for a plurality of lighting devices based on the created library and/or scenario.

In detail, the present invention is to provide a lighting device and a method and system for controlling the same that support enhancement of reusability of the library and/or scenario.

In addition, the present invention provides a lighting device and a method and system for controlling the same that provide efficiency and completeness of a performance directing method (i.e., integrated lighting control performance according to one embodiment of the present invention) in which different lighting devices collectively operate with an light emitting pattern specialized for the lighting devices to produce a specific shape as a whole.

In addition, the present invention is to provide a lighting device and a method and system for controlling the same that implement data communication between components in the lighting device control system based on a communication method optimized for the integrated lighting control performance.

However, technical problems to be achieved by the present invention are not limited to the technical problems described above, and other technical problems may exist.

A lighting device and a method for controlling the same according to one embodiment of the present invention are a method for controlling the lighting device by a directing application executed by at least one processor of a director terminal. The method comprises creating a library which sets light emitting patterns for a plurality of lighting, creating a scenario which sets a predetermined time for the light emitting patterns for the plurality of lighting, creating performance preparation data including at least one of the library and the scenario, providing the created performance preparation data to the plurality of lighting devices, transmitting, to the plurality of lighting devices, a lighting device control signal which instructs execution, suspension, or termination of at least one of the library and the scenario provided in the performance preparation data, and implementing integrated lighting control performance according to the transmitted lighting device control signal.

The integrated lighting control performance may be a method of directing the performance of the plurality of lighting devices to make the plurality of the lighting devices to operate collectively in a specified light emitting pattern set for each seat where each of the lighting devices is placed, and to make the collective operation of each of the plurality of the lighting devices in the specified light emitting pattern for each seat a unified shape as a whole.

The creating of the library may comprise setting a library identification information for specifying the library, and a light emitting pattern information for specifying a parameter value related to at least one of turning on/off, color, brightness, and dynamic effects of the lighting device.

The creating of the library may further comprises setting a property change information for changing at least one parameter value of the light emitting pattern information.

The setting the property change information may be performed based on at least one of a property conversion input which replaces an existing parameter setting value with a new parameter setting value and a property transformation input which replaces the existing parameter setting value with a predetermined operation result value based on the existing parameter setting value and the new parameter setting value.

The creating the library may further comprise creating a seat-specific library which identifies each of the plurality of lighting devices being arranged to each seat with the same library identification information, and has a different light emitting pattern information at least between several lighting devices.

The creating the scenario may comprise setting a scenario identification information for specifying the scenario, and a scenario pattern information for specifying a parameter value relating to at least one of turning on/off, color, brightness, and dynamic effects of the lighting device.

The creating the scenario may further comprise setting the scenario pattern information based on a light emitting pattern information according to a combination of at least one library.

The creating the scenario may further comprise setting a property change information with respect to at least one of the libraries when the scenario is created based on the library.

The creating the scenario may further comprise creating a seat-specific scenario which identifies each of the plurality of lighting devices being arranged to each seat with the same scenario identification information, and has the different scenario pattern information for each seat where the plurality of lighting devices are to be placed.

The creating the library may comprise setting an execution section for executing the library from a predetermined start time to a predetermined end time.

The creating the library may comprise providing a library grouping function for grouping, storing, and managing a combination of a plurality of libraries.

The transmitting the lighting device control signal to the plurality of lighting devices may comprise transmitting a lighting device control signal including the same command to the plurality of lighting devices using a broadcasting method.

The implementing the integrated lighting control performance may comprise emitting a light in a unified shape as a whole by operating the plurality of lighting devices in different light emitting patterns.

A method for controlling a light device according to one embodiment of the present invention is a method for controlling a plurality of lighting devices using lighting device control system comprising a director terminal for creating and providing performance preparation data, a lighting device for receiving and storing the performance preparation data, and a central server relaying data transmission/reception between the director terminal and the lighting device. The method comprises requesting, by the director terminal, to the central server to transmit a lighting device control signal which instructs execution, suspension, or termination of at least one of a library and a scenario in the performance preparation data, transmitting, by the central server receiving the request, the lighting device control signal to the plurality of lighting devices in a broadcasting method, detecting, by a lighting device receiving the lighting device control signal, at least one of a library and a scenario corresponding to the received lighting device control signal from the stored performance preparation data, and controlling, by the lighting device, a light source unit of the lighting device to execute a light emitting pattern based on at least one of the detected library and scenario.

The controlling of the light source unit of the lighting device may comprise controlling the light source unit to execute a light emitting pattern based on a property change information with respect to at least one of the detected library and scenario.

The property change information may be an information for changing a parameter value related to at least one of turning on/off, color, brightness, and dynamic effects of the lighting device set for a predetermined section in a predetermined library.

According to one embodiment of the present invention, a lighting device comprises at least one communication unit, at least one storage unit, a light source unit, and at least one processor which controls the communication unit to receive performance preparation data, controls the storage unit to store the received performance preparation data, controls the communication unit to receive a lighting device control signal, controls to read out at least one of a library and a scenario corresponding to the received lighting device control signal from the performance preparation data in the storage unit, and controls the light source unit to execute an light emitting pattern according to at least one of the library and the scenario.

The processor may control the light source unit based on a light emitting pattern which reflects a property change information with respect to at least one of the library and scenario.

The processor may control the light source unit based on the light emitting pattern according to at least one of a property conversion input and a property transformation input for changing the parameter value related to at least one of turning on/off, color, brightness, and dynamic effect of the light source unit.

According to one embodiment of the present invention, a director terminal comprises at least one memory configured to store a direction application, and at least one processor configured to execute the directing application of the memory. The directing application is configured to create a library comprising a plurality of seat-specific libraries which specify a light emitting pattern of a plurality of lighting devices to correspond to each seat where the plurality of lighting devices are to be placed, to create a scenario which makes the plurality of lighting devices an perform integrated lighting control performance for a predetermined time based on a plurality of libraries including the library. And in order to create the scenario the directing application is further configured to set the plurality of lighting devices to operate in accordance with a specific library included in the plurality of libraries for a preset time and to set a property change information for changing at least one parameter value of light emitting pattern information of the specific library within the preset time.

According to the lighting device and the method and system for controlling the same of one embodiment of the present invention, it is possible to create the library and/or the scenario for controlling light emitting of the lighting device and control light emitting of the plurality of lighting devices based on the created library and/or scenario. Accordingly, there is an effect that it is possible to easily and conveniently execute the light emitting operations specialized for each of the plurality of lighting devices arranged and distributed to each number of seats in a performance hall with high accuracy.

In addition, with the lighting device and the method and system for controlling the same according to one embodiment of the present invention, it is possible to perform light emitting control of the plurality of lighting devices based on the library and/or scenario, and thus, it is possible to implement a performance directing method (e.g., integrated lighting control performance) in which different lighting devices collectively operate with the light emitting patterns specialized in the lighting devices to produce a specific shape as a whole.

In addition, with the lighting device and the method and system for controlling the same according to one embodiment of the present invention, it is possible to support enhancement of reusability of the library and/or scenario. For example, using the lighting device and the method and system for controlling the same of one embodiment of the present invention, when a new library and/or scenario other than the existing library and/or scenario is required, the new library and/or the new scenario can be created by actively utilizing the library and/or scenario that has been produced without producing the new library and/or scenario from the beginning and by modifying the previously produced library and/or the scenario as least as being required.

In addition, using to the lighting device and the method and system for controlling the same according to one embodiment of the present invention, it is possible to support the creation of the new library and/or the new scenario easily and quickly by providing the reuse of the library and/or scenario. Accordingly, there is an effect of reducing data and, at the same time, in the lighting device and the method and system for controlling the same according to one embodiment of the present invention, it is possible to implement more various light emitting patterns even with a little quantity of the library and/or scenario.

In addition, using the lighting device and the method and system for controlling the same according to one embodiment of the present invention, it is possible to provide efficiency and completeness of a performance directing method (e.g., integrated lighting control performance-production) in which different lighting devices collectively operate with an light emitting pattern specialized in the lighting devices to produce a specific shape as a whole. Accordingly, it is possible to reduce various efforts and costs required for the integrated lighting control performance and improve a degree of perfection.

Using the lighting device and the method and system for controlling the same according to one embodiment of the present invention, it is possible to implement data communication between components in the lighting device control system based on a communication method optimized for the integrated lighting control performance. Therefore, it is possible to minimize communication errors such as omission of control signal communication for lighting devices or communication sync. errors between multiple lighting devices, thus the improved efficiency can be achieved.

In addition, with the lighting device and the method and system for controlling the same according to one embodiment of the present invention, using the optimized communication method, it is possible to easily implement light emitting operations based on the light emitting pattern pre-stored in each of the plurality of lighting devices by simply transmitting a single control signal to the plurality of lighting devices. Therefore, it is possible to provide a flexible communication environment by transmitting a common control signal to multiple lighting devices easily and quickly, and minimizing the communication load can be achieved. Furthermore, using the lighting device and the method and system for controlling the same according to one embodiment of the present invention, in such a flexible communication environment, integrated lighting control performance as described above may be supported.

However, effects obtainable by the present invention are not limited to the above-mentioned effects, and other effects not mentioned can be clearly understood from the description below.

BRIEF DESCRIPTION OF THE DRAWINGS

FIG. 5 is an example of a diagram for explaining a library creation method according to one embodiment of the present invention.

FIG. 11 is an example of a diagram for explaining a scenario creation method according to one embodiment of the present invention.

DESCRIPTION OF EMBODIMENTS

Figure 1:
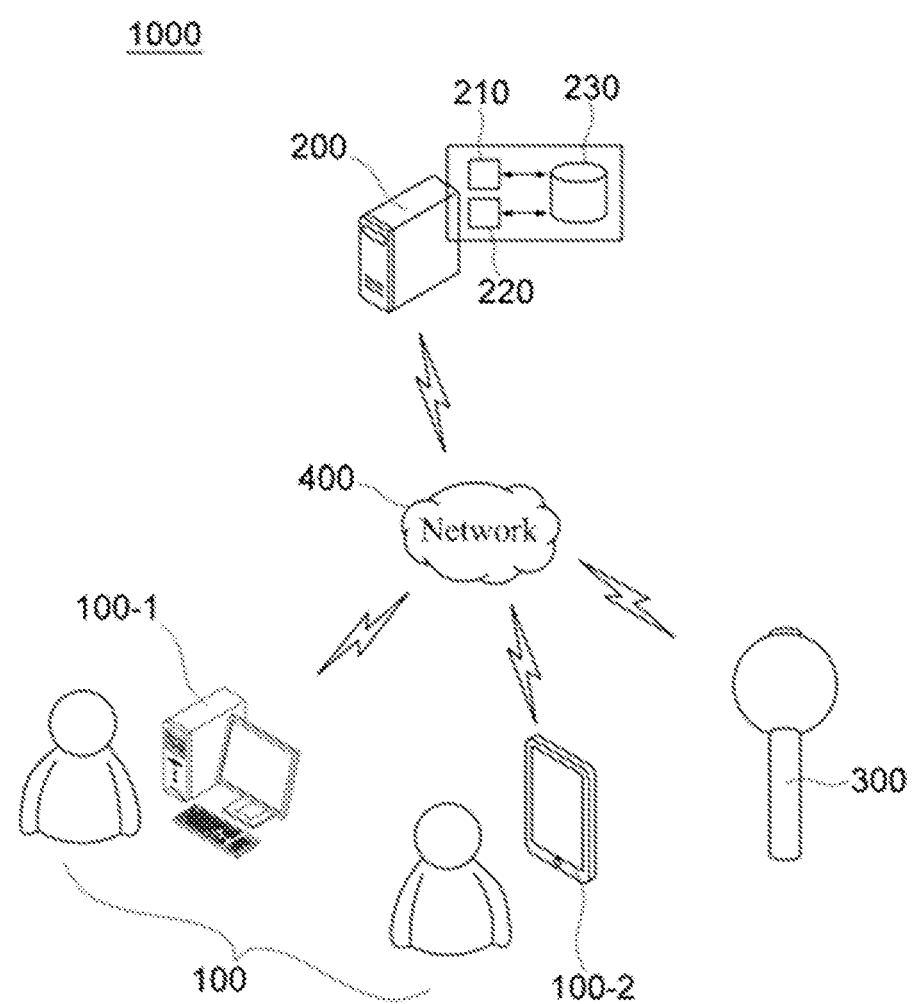
FIG. 1 is a conceptual diagram of a lighting device control system according to one embodiment of the present invention.

Since the present invention may apply to various transformations and have various embodiments, particular embodiments will be described and illustrated in detail below. But this is only for the purpose of the explanation of the embodiments of the present invention but not for the purpose of limiting or abandoning the possible modifications which a person having ordinary skill in the art may conceive. Effects and features of the present invention, and a method of achieving them will become apparent with reference to embodiments described below in detail in conjunction with the drawings. In the following embodiments, terms such as first, second, or the like are used for the purpose of distinguishing one component from the other, not in a limiting sense. Moreover, a singular expression includes a plural expression unless the context clearly dictates otherwise. In addition, terms such as include or have means that the features or components described in the specification are present, and do not preclude the possibility that one or more other features or components will be added. In addition, in the drawings, the size of the components may be exaggerated or reduced for convenience of description. For example, since the size and thickness of each component illustrated in the drawings are arbitrarily indicated for convenience of description, the present invention is not necessarily limited to the illustrated drawing.

Hereinafter, embodiments of the present invention will be described in detail with reference to the accompanying drawings, and when described with reference to the drawings, the same reference numerals are assigned to the same or corresponding components, and overlapping descriptions thereof will be omitted.

FIG. 1 is a conceptual diagram of a lighting device control system according to one embodiment of the present invention.

Referring to FIG. 1, a lighting device control system 1000 according to one embodiment of the present invention may provide a lighting device control service that creates a library and/or scenario that controls light emitting of a lighting device, and performs light emitting control for a plurality of lighting devices based on the created library and/or scenario.

In one embodiment, the lighting device control system 1000 that provides the above lighting device control service may include a terminal 100, a central server 200, a lighting device 300, and a network 400.

The terminal 100, the central server 200, and the lighting device 300 may be connected through the network 400.

The network 400 according to the embodiment means a connection structure capable of exchanging information with each other, such as the terminal 100, the central server 200, and/or the lighting device 300. Examples of the network 400 include a 3rd Generation Partnership Project (3GPP) network, a Long Term Evolution (LTE) network, a World Interoperability for Microwave Access (WIMAX) network, the Internet, a Local Area Network (LAN), a Wireless LAN (Wireless Local Area Network), a Wide Area Network (WAN), a Personal Area Network (PAN), a Bluetooth network, a satellite broadcasting network, an analog broadcasting network, a Digital Multimedia Broadcasting (DMB) network, and the like, but are not limited thereto.

Hereinafter, the terminal 100, the central server 200, and the lighting device 300 implementing the lighting device control system 1000 will be described in detail with reference to the accompanying drawings.

Terminal 100

The terminal 100 according to one embodiment of the present invention may be a predetermined computing device on which a lighting control application (hereinafter, an application) providing the lighting device control service is installed.

The application according to the embodiment may be divided into a directing application and a cheering application.

The directing application and the cheering application may perform different functional operations based on the users and the distinguished subject of use.

That is, the directing application and the cheering application may be distinguished based on the different authorities granted according to an account of a user (e.g., whether the user of the directing application is the director of the performance or the spectator of the performance) and perform different functional operations.

The directing application and the cheering application may be a single application.

Returning to the description, the terminal 100 which installs the application above may include a director terminal 100-1 used by the director who plans the performance, and a cheering stick terminal 100-2 of the user who uses the lighting device 300 while watching the performance.

In one embodiment, the above-mentioned directing application may be installed on the director terminal 100-1, and the above-mentioned cheering application may be installed on the cheering stick terminal 100-2.

The director terminal 100-1 and the cheering stick terminal 100-2 are distinguished for the purpose of the subjects of use according to the embodiment, but their components or functional operations may be the same.

However, in one embodiment, the cheering stick terminal 100-2 may perform various functional operations for a lighting device control service by matching and interworking with a predetermined lighting device 300 in a one-to-one scheme.

In detail, in one embodiment, the cheering stick terminals 100-2 may be mapped one-to-one to each other and may be operated in pairs based on a terminal identification code specifying each cheering stick terminal 100-2 and a device identification code specifying each lighting device 300.

From a hardware point of view in detail, the terminal 100 may include a mobile type computing device and/or a desktop type computing device on which the application is installed.

The mobile type computing device may be a mobile device such as a smart phone or a tablet PC on which an application is installed.

For example, the mobile type computing device may include a smart phone, a mobile phone, a digital broadcasting device, personal digital assistants (PDA), a portable multimedia player (PMP), a tablet PC, and the like.

In addition, the desktop type computing device may include a device or the like on which a program for executing the lighting device control service based on wired/wireless communication is installed, and the device may include a fixed desktop PC, a laptop, and a personal computer such as an ultrabook in which the application is installed.

Moreover, according to one embodiment, the terminal 100 may further include a predetermined server computing device that provides a lighting device control service environment.

Figure 2:
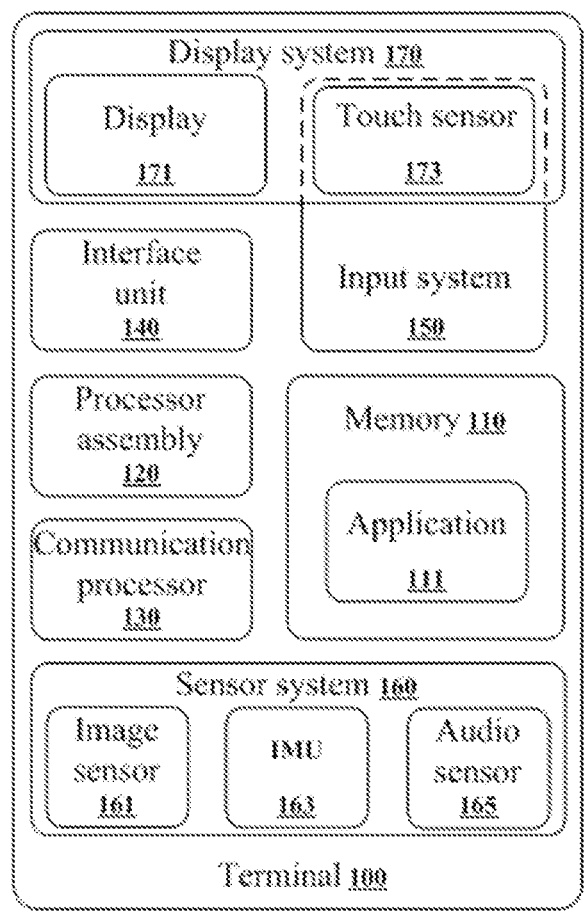
FIG. 2 is an internal block diagram of a terminal according to one embodiment of the present invention.

FIG. 2 is an internal block diagram of the terminal 100 according to one embodiment of the present invention.

Meanwhile, referring to FIG. 2, from a functional point of view, the terminal 100 includes a memory 110, a processor assembly 120, a communication processor 130, an interface unit 140, an input system 150, a sensor system 160, and a display system 170. These components may be included in a housing of the terminal 100.

In detail, an application 111 is stored in the memory 110, and the application 111 may store any one or more of various application programs, data, and commands for providing the lighting device control service environment.

That is, the memory 110 may store commands and data that may be used to create the lighting device control service environment.

Further, the memory 110 may include a program area and a data area.

The program area according to the embodiment may be linked between an operating system (OS) for booting the terminal 100 and functional elements, and the data area may store data generated according to the use of the terminal 100.

In addition, the memory 110 may include at least one or more non-transitory computer-readable storage media and a temporary computer-readable storage medium.

For example, the memory 110 may be various storage devices such as ROM, EPROM, flash drive, and hard drive, and may include web storage that performs a storage function of the memory 110 on the Internet.

The processor assembly 120 may include at least one processor capable of executing instructions of the application 111 stored in the memory 110 to perform various tasks for creating the lighting device control service environment.

According to the embodiment, the processor assembly 120 may control the overall operation of the component through the application 111 stored in the memory 110 to provide the lighting device control service.

The processor assembly 120 may be a system-on-chip (SOC) suitable for the terminal 100 including a central processing unit (CPU) and/or a graphics processing unit (GPU), may execute an operating system (OS) and/or an application program stored in the memory 110, and may control each component mounted in the terminal 100.

In addition, the processor assembly 120 may internally communicate with each component through a system bus and may include one or more predetermined bus structures including a local bus.

In addition, the processor assembly 120 may be configured to include at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electrical units for performing other functions.

The communication processor 130 may include one or more devices for communicating with an external device. The communication processor 130 may communicate through a wireless network.

In detail, the communication processor 130 may communicate with the terminal 100 storing a content source for implementing the lighting device control service environment and may communicate with various user input components such as a controller that receives a user input.

In the embodiment, the communication processor 130 may transmit and receive various data related to the lighting device control service to other terminals 100, an external server and/or device, and the like.

The communication processor 130 may wirelessly transmit and receive data from/to at least one of a base station, an external terminal 100, and an arbitrary server on a mobile communication network constructed through a communication device capable of performing technical standards or communication methods for mobile communication (for example, Long Term Evolution (LTE), Long Term Evolution-Advanced (LTE-A), 5G NR (New Radio), WIFI), a short-range communication method, or the like.

The sensor system 160 may include various sensors such as an image sensor 161, a position sensor (IMU) 163, an audio sensor 165, a distance sensor, a proximity sensor, and a contact sensor.

The image sensor 161 may capture an image and/or a video of a physical space around the terminal 100.

In the embodiment, the image sensor 161 may capture and obtain an image (for example, a planned performance directing image, or the like) related to the lighting device control service.

In addition, the image sensor 161 may be disposed on the front or/and rear of the terminal 100 to obtain an image by photographing the disposed direction side and may photograph a physical space through a camera disposed toward the outside of the terminal 100.

The image sensor 161 may include an image sensor device and an image processing module. Specifically, the image sensor 161 may process a still image or a moving image obtained by the image sensor device (for example, CMOS or CCD).

In addition, the image sensor 161 may process the still image or the moving image obtained through the image sensor device using the image processing module to extract necessary information, and transmit the extracted information to the processor.

The image sensor 161 may be a camera assembly including at least one camera.

The camera assembly may include a general camera for photographing a scene in a visible light and may further include a special camera such as an infrared camera or a stereo camera.

In addition, the image sensor 161 as described above may be included in the terminal 100 and operated according to one embodiment, and may be included in an external device (for example, an external server and/or apparatus, or the like) to be operated through interworking based on the above-described communication processor 130 and/or interface unit 140.

The inertial measurement unit (IMU, 163) may sense at least one or more of a motion and an acceleration of the terminal 100. For example, the BIU 163 may consist of a combination of various position sensors such as an accelerometer, a gyroscope, and a magnetometer.

In addition, the location sensor IMU 163 may recognize spatial information on the physical space around the terminal 100 by interworking with the location communication processor 130 such as GPS of the communication processor 130.

The audio sensor 165 may recognize a sound around the terminal 100.

In detail, the audio sensor 165 may include a microphone capable of detecting a voice input of a user using the terminal 100.

In the embodiment, the audio sensor 165 may receive voice data required for a lighting device control service from a user.

The interface unit 140 may communicatively connect the terminal 100 to one or more other devices.

In detail, the interface unit 140 may include a wired and/or wireless communication device compatible with one or more different communication protocols.

The terminal 100 may be connected to various input/output devices through the interface unit 140.

For example, the interface unit 140 may be connected to an audio output device such as a headset port or a speaker to output audio.

For example, although it has been described that the audio output device is connected through the interface unit 140, one embodiment in which the audio output device is installed inside the terminal 100 may also be included.

Also, for example, the interface unit 140 may be connected to an input device such as a keyboard and/or a mouse to obtain a user input.

For example, although it has been described that the keyboard and/or mouse are connected through the interface unit 140, one embodiment in which the keyboard and/or mouse are installed inside the terminal 100 may also be included.

The interface unit 140 may be configured to include at least one of a wired/wireless headset port, an external charger port, a wired/wireless data port, a memory card port, a port for connecting a device including an identification module, an audio Input/Output (I/O) port, a video I/O (Input/Output) port, an earphone port, a power amplifier, an RF circuit, a transceiver, and other communication circuits.

The input system 150 may sense a user's input (for example, gesture, voice command, actuation of a button, or other type of input) related to the lighting device control service.

Specifically, the input system 150 may include a predetermined button, a touch sensor, and/or an image sensor 161 for receiving user motion input, and the like.

Moreover, the input system 150 may be connected to an external controller through the interface unit 140 to receive a user's input.

The display system 170 may output various information related to the lighting device control service as a graphic image.

In an embodiment, the display system 170 may display various user interfaces including a library creation interface and/or a scenario creation interface.

The display may include at least one of a liquid crystal display (LCD), a thin film transistor-liquid crystal display (TFT LCD), an organic light-emitting diode (OLED), a flexible display, a three-dimensional display (3D display), an e-ink display (e-ink display).

The components may be disposed in the housing of the terminal 100, and the user interface may include a touch sensor 173 on the display 171 configured to receive a user touch input.

In detail, the display system 170 may include the display 171 that outputs an image, and the touch sensor 173 that detects a user's touch input.

For example, the display 171 may serve as a touch screen by forming a layer structure with the touch sensor 173 or being integrally formed therewith.

Such a touch screen may function as a user input unit providing an input interface between the terminal 100 and the user, and may provide an output interface between the terminal 100 and the user.

In addition, according to an embodiment, the terminal 100 may further perform at least a part of functional operations performed by the central server 200 and/or the lighting device 300 to be described later.

Central Server 200

Meanwhile, the central server 200 according to one embodiment of the present invention may perform a series of processes for providing the lighting device control service.

In detail, in one embodiment, the central server 200 exchanges data necessary for the lighting device 300 control process to be executed in an external device such as the terminal 100 and/or the lighting device 300 with the external device, and thus, can provide the lighting device control service.

In an embodiment, the central server 200 may provide an environment in which the application 111 may operate in an external device (for example, a mobile type computing device and/or a desktop type computing device, or the like).

To this end, the central server 200 may include an application program, data, and/or commands for operating the application 111, and may transmit/receive data based thereon to/from the external device.

In addition, in an embodiment, the central server 200 may provide a signal capable of implementing a predetermined light emitting operation in an external device (for example, the lighting device 300).

To this end, the central server 200 may include an application program, data, and/or commands for implementing the light emitting operation and may transmit and receive data in communication with the external device.

In addition, in an embodiment, the central server 200 may create a library.

The library according to the embodiment of the present invention may mean preset data to make the lighting device 300 operate with a specific light emitting pattern (that is, a specific light emitting form).

Moreover, in the embodiment, the central server 200 may create a scenario.

The scenario according to the embodiment of the present invention may mean preset data to make the lighting device 300 operate in a specific light emitting pattern for a predetermined time.

In addition, in the embodiment, the central server 200 may create performance preparation data.

The performance preparation data according to the embodiment of the present invention means data in which various light emitting patterns for each seat where the lighting device 300 is arranged for the integrated lighting control performance are defined in advance. Moreover, the performance preparation data may mean pre-stored data in the lighting device 300 before the performance starts.

In addition, in the embodiment, the central server 200 may distribute the created performance preparation data.

In detail, in the embodiment, the central server 200 may distribute the performance preparation data in conjunction with the terminal 100 (e.g., the director terminal 100-1 and/or the cheering stick terminal 100-2), or the like to the plurality of lighting devices 300.

In addition, the central server 200 may transmit the lighting device control signal to the plurality of lighting devices 300 to implement integrated lighting control performance.

The lighting device control signal according to the embodiment may mean a signal instructing execution/suspension/termination of at least one library and/or scenario included in the performance preparation data stored in the lighting device 300.

In the embodiment, the central server 200 may interwork with at least one repeater in order to smoothly transmit the lighting device control signal to the plurality of lighting devices 300.

The at least one repeater according to the embodiment may transmit a predetermined data packet (e.g., lighting device control signal) to the lighting devices 300 adjacent thereto based on a broadcasting method.

For reference, the broadcasting method may be a one-to-many communication method in which a predetermined data packet is transmitted to the entire network which the network host overlooks without designation of a separate recipient.

The at least one repeater that performs data transmission in a broadcasting scheme may be included in the central server 200 or may be a separate device spread out within the entire network to perform the functional operation as described above.

The following description is based on the implementation of the at least one repeater being included in the central server 200, but the present invention is not limited thereto.

The central server 200 may store and manage various application programs, commands, and/or data, or the like for implementing the lighting device control service.

In an embodiment, the central server 200 may store and manage at least one or more libraries, scenarios, performance preparation data, lighting device control signals, and/or various user interfaces.

Referring further to FIG. 1, the central server 200 may be a predetermined computing device including at least one or more processor modules 210 for data processing, at least one or more communication modules 220 for exchanging data with an external device, and at least one or more database modules 230 for storing various application programs, data, and/or commands for providing the lighting device control service.

The database module 230 may store any one or more of an operating system (OS), various application programs, data, and commands for providing the lighting device control service.

Moreover, the database module 230 may include a program area and a data area.

The program area according to the embodiment may be linked between an operating system (OS) for booting the server and functional elements, and the data area may store data generated according to the use of the server.

In an embodiment, the database module 230 may be various storage devices such as ROM, RAM, EPROM, flash drive, hard drive, and the like, and may be a web storage performing the storage function of the database module 230 through the Internet.

In addition, the database module 230 may be a recording medium in a form detachable from the server.

The processor module 210 may control the overall operation of each of the above-described units in order to implement the lighting device control service.

The processor module 210 may be a system-on-a-chip (SOC) suitable for a server including a central processing unit (CPU) and/or a graphics processing unit (GPU), may execute an operating system (OS) and/or the application 111 stored in the database module 230, and may control each component mounted on the server.

In addition, the processor module 210 may communicate with each component internally by a system bus and may include one or more predetermined bus structures including a local bus.

In addition, the processor module 210 may be implemented to use at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electrical units for performing other functions.

In the above description, it has been described that the central server 200 according to the embodiment of the present invention performs all of the functional operation as described above.

However, at least some of the functional operations which was described to be performed by the central server 200 may be performed by an external device (e.g., the terminal 100 and/or the lighting device 300). In addition, it is also be possible for the present invention to be modified in various embodiments where the central server 200 may further perform at least some of the functional operations which are performed by the external device.

Lighting Device 300

The lighting device 300 according to the embodiment of the present invention may perform the light emitting operation according to the control of the lighting device control system 1000.

Here, the lighting device 300 according to the embodiment may refer to a device that an individual carries or is provided to an individual and emits light in various patterns. The lighting device 300 may be possessed by users who watch the performance in a predetermined space, such as a concert hall, or may be provided by attaching to each seat of the users.

In detail, in the embodiment, the lighting device 300 may store and manage the performance preparation data as described above.

Moreover, in the embodiment, the lighting device 300 may receive the lighting device control signal as described above.

In the embodiment, the lighting device 300 may perform a light emitting operation according to the received lighting device control signal and the stored performance preparation data.

Figure 3:
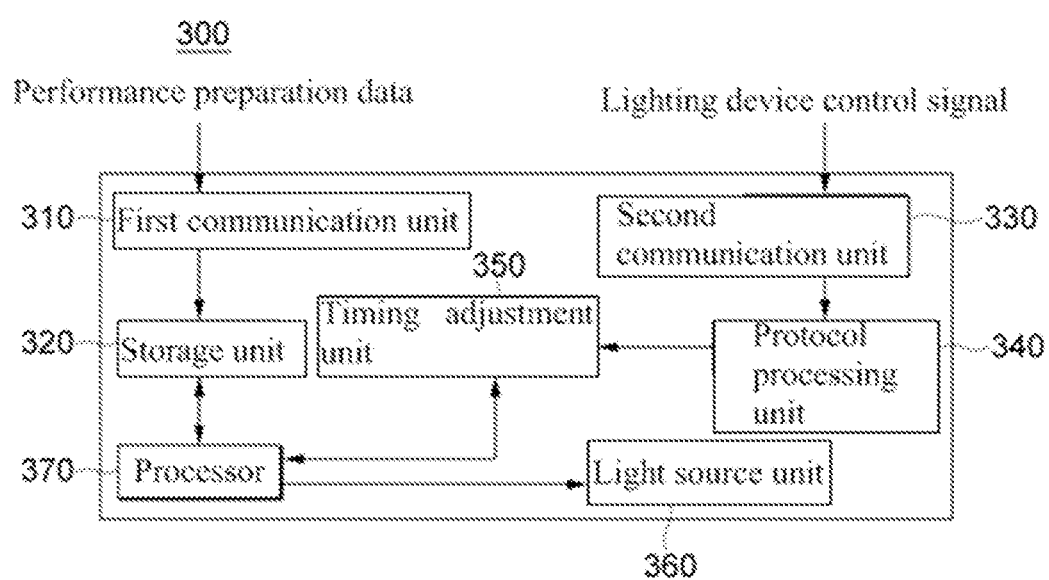
FIG. 3 is an internal block diagram of a lighting device according to one embodiment of the present invention.

FIG. 3 is an internal block diagram of the lighting device 300 according to one embodiment of the present disclosure.

More specifically, referring to FIG. 3, the lighting device 300 may include a first communication unit 310, a storage unit 320, a second communication unit 330, a protocol processing unit 340, a timing adjustment unit 350, a light source unit 360, and a processor 370.

The first communication unit 310 may receive the performance preparation data from the terminal 100.

The first communication unit 310 may include a BLE module or a wireless communication module complying with the IEEE 802.15.4 standard. However, there is no need to be limited thereto, and the first communication unit 310 may receive the performance preparation data through a wire communication.

In addition, in the embodiment, the storage unit 320 may store and manage the received performance preparation data and the like.

In the embodiment of the present invention, the lighting device 300 may receive and store performance preparation data in advance at a place (for example, home, or the like) other than the performance hall, or may receive and store the performance preparation data in the performance hall.

In addition, the second communication unit 330 may receive the lighting device control signal from the central server 200 (and/or a repeater).

The second communication unit 330 may transmit/receive data to/from the central server 200 (and/or repeater), using Radio Frequency (RF) communication such as Bluetooth, Bluetooth Low Energy (BLE), WiFi, ZigBee, and UWB.

And the protocol processing unit 340 may determine the type of information received by the first communication unit 310 and/or the second communication unit 330.

When the received information is a control message (that is, a lighting device control signal according to the embodiment), a retransmission packet, or a sync packet, the protocol processing unit 340 may transmit the received information to the timing adjustment unit 350.

Subsequently, the timing adjustment unit 350 may adjust the operation timing of the lighting device 300 based on each sequence of the control message included in the received control message, retransmission packet, or sync packet.

Although the timing adjuster 350 has been described as a separate component in FIG. 3, this is merely an example and may be included in the configuration of the processor 370 according to the embodiment.

In addition, the light source unit 360 may perform a light emitting operation such as emitting light of a specific color, blinking, or adjusting the brightness according to the information stored in the storage unit 320 and the control of the processor 370.

The light source unit 360 may be formed of an LED, but this is only an example and may be implemented in any form that can perform a predetermined light emitting operation by being made of a specific light emitting material.

Moreover, the processor 370 may control the overall operation of the lighting device 300.

In the embodiment, the processor 370 may control the light emitting operation of the light source unit 360 based upon the performance preparation data stored in the storage unit 320 and the lighting device control signal received through the second communication unit 330.

The processor 370 may determine whether to execute any library and/or scenario in the performance preparation data based on the received lighting device control signal.

That is, the processor 370 parses the received lighting device control signal to determine which library and/or scenario among predetermined libraries and/or scenarios to play.

In addition, the processor 370 may control the light source unit 360 to perform the light emitting operation according to the determined library and/or scenario.

In particular, the processor 370 may read out a light emitting pattern corresponding to the identification information from the storage unit 320 based on library and/or scenario identification information included in the lighting device control signal. Moreover, the processor 370 may control the light source unit 360 to output the read-out light emitting pattern.

In addition, the lighting device 300 may further perform at least some of the functional operations performed by the above-described terminal 100 and/or the central server 200.

Lighting Device Control Method

Hereinafter, a method for controlling the lighting device 300 by the directing application 111 executed by at least one processor of the director terminal 100-1 according to the embodiment of the present invention will be illustrated in detail with reference to FIGS. 4 to 13.

In the embodiment of the present invention, at least one or more processors of the director terminal 100-1 may execute at least one or more directing applications 111 stored in at least one or more memories 110 or may cause the directing application 111 to operate in a background state.

Hereinafter, the execution of the method of providing the lighting device control service described above by the at least one or more processors which executes the instructions of the directing application 111 will be briefly described as being performed by the directing application 111.

Figure 4:
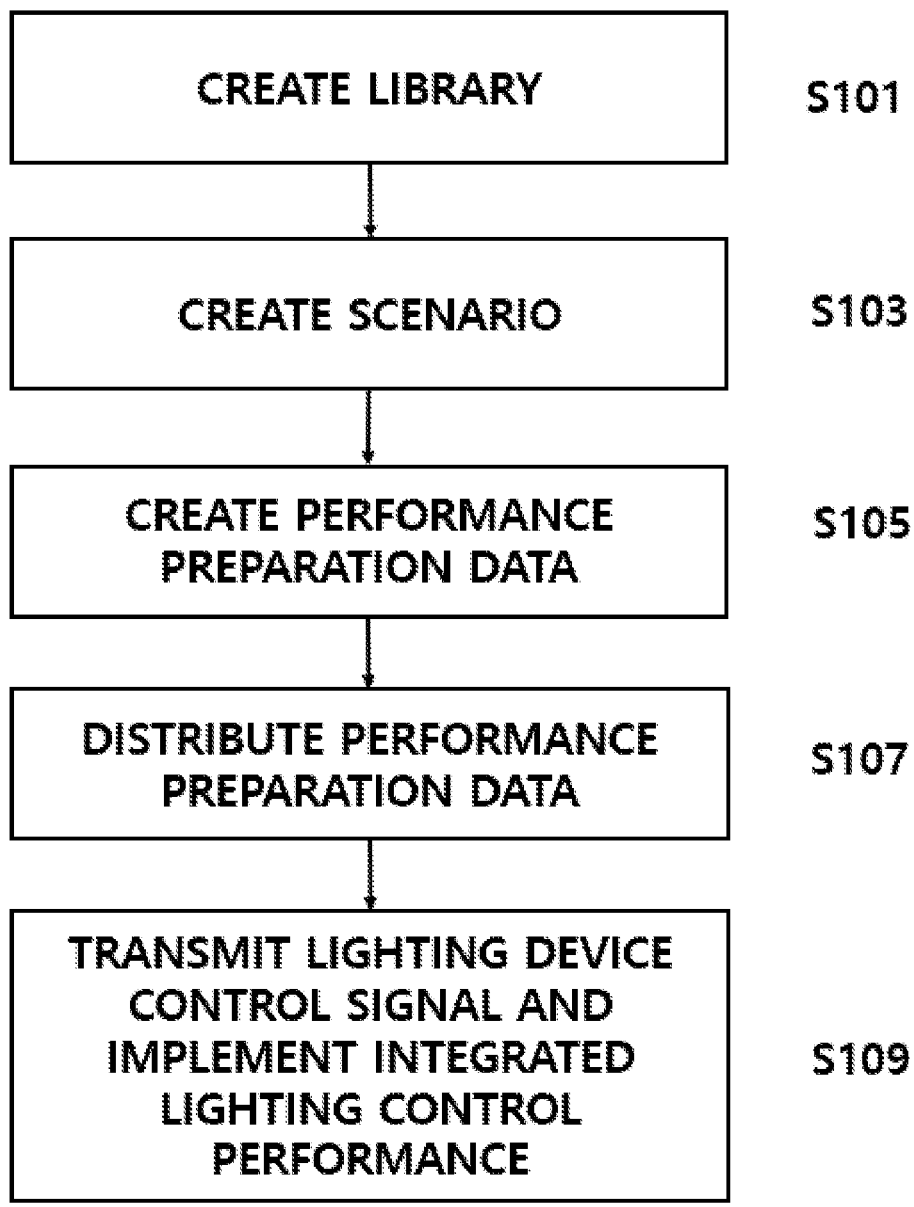
FIG. 4 is a flowchart for explaining a lighting device control method according to one embodiment of the present invention.

FIG. 4 is a flowchart for explaining a lighting device control method according to the embodiment of the present invention.

Referring to FIG. 4, the director application 111 executed by at least one processor of the director terminal 100-1 or operated in a background state may create the library (S101).

The library according to one embodiment of the present disclosure is preset data which makes the lighting device 300 operate in a specific light emitting pattern (that is, a specific light emitting type), and may include library identification information and light emitting pattern information.

In more detail, the library may include an identification information (for example, identification number and/or library name, or the like) for specifying the library, and light emitting pattern information for providing a specific light emitting pattern.

The light emitting pattern information according to the embodiment may include parameters pertaining to turning on/off (i.e., activating/deactivating light emission), color, brightness, and/or dynamic effect of the light device 300, and the lighting device 300 may be operated according to the setting value (hereinafter, referred to as light emitting pattern setting value) for each parameter.

The dynamic effect may be data that implements a predetermined effect by dynamically changing the setting values for other parameters (e.g., turning on/off, color, and/or brightness of the lighting device) in the light emitting pattern information.

Illustratively, the dynamic effect may include a blinking effect by setting the lighting device flickering rapidly during a certain period of time, a gradation effect that gradually changes the color of the lighting device by setting the color differently for each time period, a fade in/out effect that gradually darkens or brightens the lighting device by setting the light emitting brightness differently for each time period, and the like.

In the embodiment of the present invention, the directing application 111 may create at least one or more libraries as described above.

For example, the directing application 111 may create a plurality of libraries such as a first library in which the library identification information and the light emitting pattern information (i.e., the light emitting pattern setting value) are set as "identification number 0001/activating light emitting/first color/first brightness/first dynamic effect" and a second library in which the library identification information and the light emitting pattern information (i.e., the light emitting pattern setting value) are set as "identification number 0002/activating/deactivating light emitting/second color/second brightness/second dynamic effect". Whether to emit light/color/brightness of the plurality of libraries may be set to have different values for a predetermined period of time depending on the integrated lighting control performance.

In addition, the directing application 111 may create the library including a seat-specific library desired to make a different light emitting pattern depending on the specific seat in the performance hall.

The seat-specific library according to the embodiment may mean a library which has the same library identification information corresponding to each seat where the lighting device 300 is to be arranged in a predetermined space (for example, a performance hall, or the like), but has the different light emitting pattern information according to the library.

Thus the directing application 111 may create a library including a seat-specific library that controls the lighting device 300 to operate with different light emitting patterns depending on the position of the seat where the lighting device 300 is arranged.

For example, the directing application 111 may create the first library including a seat-specific library which comprises the first library-first seat-first light emitting pattern information and the first library-second seat-second light emitting pattern information.

That is, the directing application 111 may create the first library based on the seat-specific library which provides the light emitting pattern setting value of the first library differently based on seats of the lighting device 300 being arranged.

Through this process, the directing application 111 may cause the lighting devices 300 arranged in different seats to collectively operate with different light emitting patterns when the first library having different light emitting patterns corresponding to each seat is executed at the same time in the corresponding space, and thus, the integrated lighting control performance can be implemented by multiple lighting devices 300 in the corresponding space.

That is, the directing application 111 implements the integrated lighting control performance in which different lighting devices 300 collectively operate with the different light emitting patterns specialized for each the lighting devices 300 to produce a specific shape as a whole, based on the above-mentioned seat-specific library.

Accordingly, the directing application 111 may be control each of the plurality of lighting devices 300 placed in different seats to perform the light emitting operation specialized for each seat in the performance hall. Through this, a specific shape planned by the director can be expressed based on the plurality of light emission patterns from the plurality of lighting devices 300.

The directing application 111 may automatically create a seat-specific library for performing an integrated performance specified for each of the plurality of seats using at least one image. For example, when a bird-shaped image corresponding to a region of a plurality of seats is inputted, the directing application 111 may classify the bird-shaped image into a plurality of pixels each of which may be associated with each of the plurality of seats. In addition, the directing application 111 may determine light emitting pattern setting values corresponding to each of the pixels of the image, and automatically create the seat-specific library with respect to the plurality of seats according to the light emitting pattern setting values.

FIG. 5 is an example of a diagram for explaining a library creation method according to an embodiment of the present invention.

Referring to FIG. 5, the directing application 111 according to the embodiment of the present invention may further include property change information (PCI) in the library.

The property change information (PCI) according to the embodiment may be information for changing the light emitting pattern setting value of each parameter (e.g., turning on/off, color, brightness, and/or dynamic effect of the lighting device) for a predetermined section with respect to the light emitting pattern information of the library that is created in advance.

In detail, the directing application 111 may choose at least one section of the light emitting pattern setting value to be changed (hereinafter, referred to as a property change section (PCS)) among all sections of the light emitting pattern setting value (hereinafter, referred to as the library application section (LAS)).

In more detail, the directing application 111 may choose at least one property change section (PCS) by specifying a start-end time for a predetermined property change section (PCS) within the library application section (LAS) based on the input of the user (here, a director).

For example, the directing application 111 may choose, within a first library application section (LAS) to which the first light emitting pattern information of the first library is applied, a first property change section (PCS) based on the user input specifying a first start-end time point.

In addition, the directing application 111 may choose, within a first library application section (LAS), a second property change section (PCS) based on the user input specifying a second start-end time point.

In addition, the directing application 111 may acquire a property change input for changing at least some of the light emitting pattern setting values (hereinafter, referred to as an existing setting value) corresponding to the chosen property change section (PCS) based on the input of the user (e.g., a director) to a new light emitting pattern setting value (hereinafter, referred to as a new setting value).

Moreover, the directing application 111 may create the above-described property change information (PCI) by matching the acquired property change input to the property change section (PCS) corresponding thereto. For example, the directing application 111 may create the property change information (PCI) for the first library based on the first property change input information (for example, changing the existing value to activate the light emission to a value to deactivate the lighting emission) for changing at least some of light emitting pattern setting values (e.g., turning on/off, color, brightness, and/or dynamic effect of the lighting device) corresponding to the first property change section (PCS) and the second property change input information for changing at least some of light emitting pattern setting values corresponding to the second property change section (PCS).

That is, the directing application 111 may create the property change information (PCI) that can easily change at least some of the light emitting pattern setting values of the pre-created library according to the needs of the user (e.g., the director).

Accordingly, when a new library other than the existing library is required, the directing application 111 can create the new library simply by applying a predetermined change to the existing library, or create a scenario having a change in various light emitting patterns through the existing library without additionally producing the new library from start to finish.

FIGS. 6 to 10 are examples of diagrams for explaining property change information (PCI) according to an embodiment of the present invention.

If a property change input for changing the existing setting value with respect to the parameters pertaining to the light emitting color, brightness, and/or dynamic effect of the lighting device 300 is inputted, the directing application 111 may obtain the property change input in a form of at least one of the property transformation input PT and/or the property transformation input PR.

The property conversion input PT according to the embodiment of the present invention may mean a change instruction input for completely replacing the existing setting values of at least one parameter of the light emitting color, brightness and/or dynamic effect corresponding to the property change section (PCS) with the new setting values.

Figure 6:
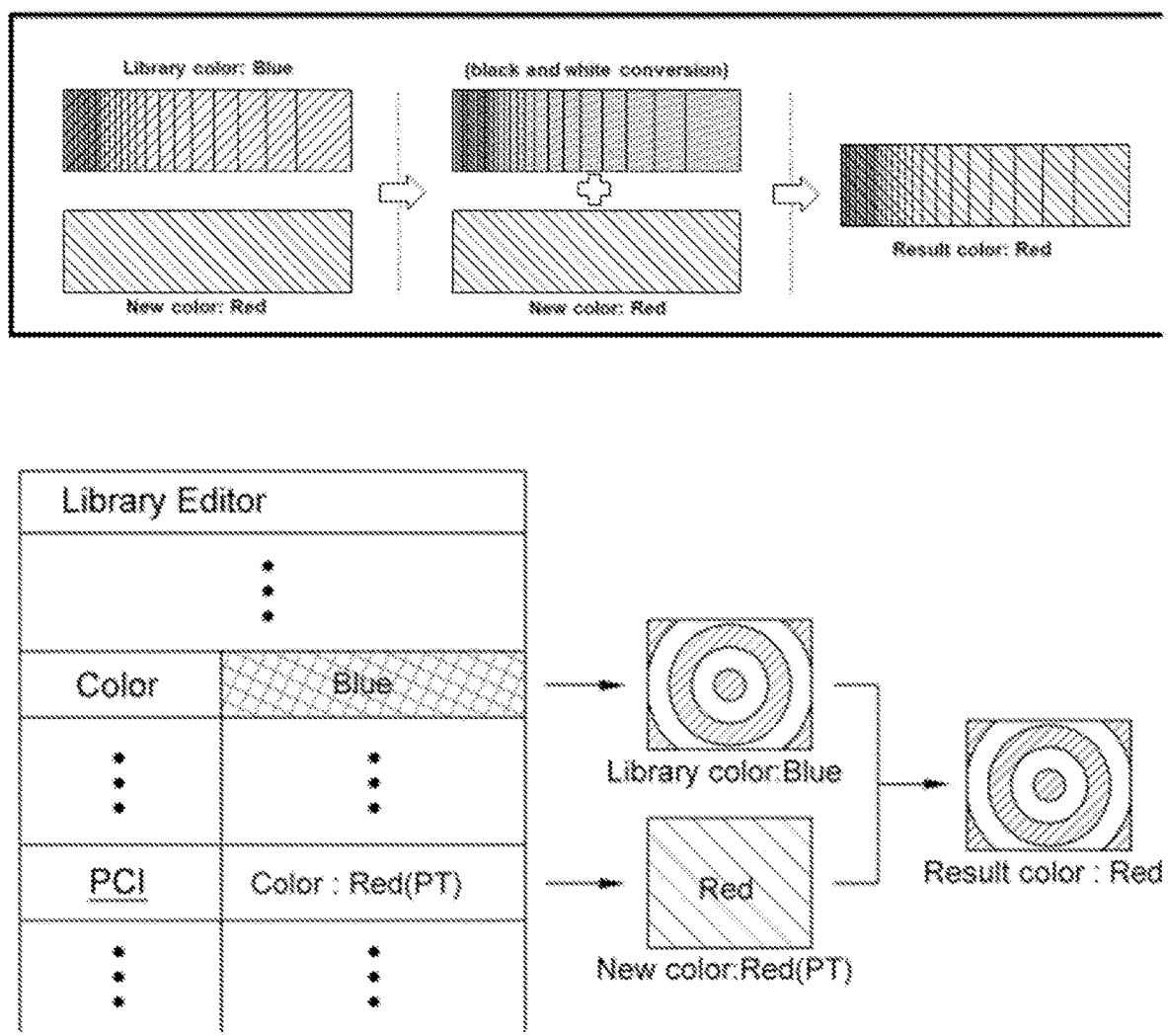
FIGS. 6 to 10 are examples of diagrams for explaining property change information according to one embodiment of the present invention.

For example, the property conversion input PT may include a light emitting color conversion input for replacing the existing light emitting color (for example, blue) with the new light emitting color (for example, red) as illustrated in FIG. 6.

Figure 7:
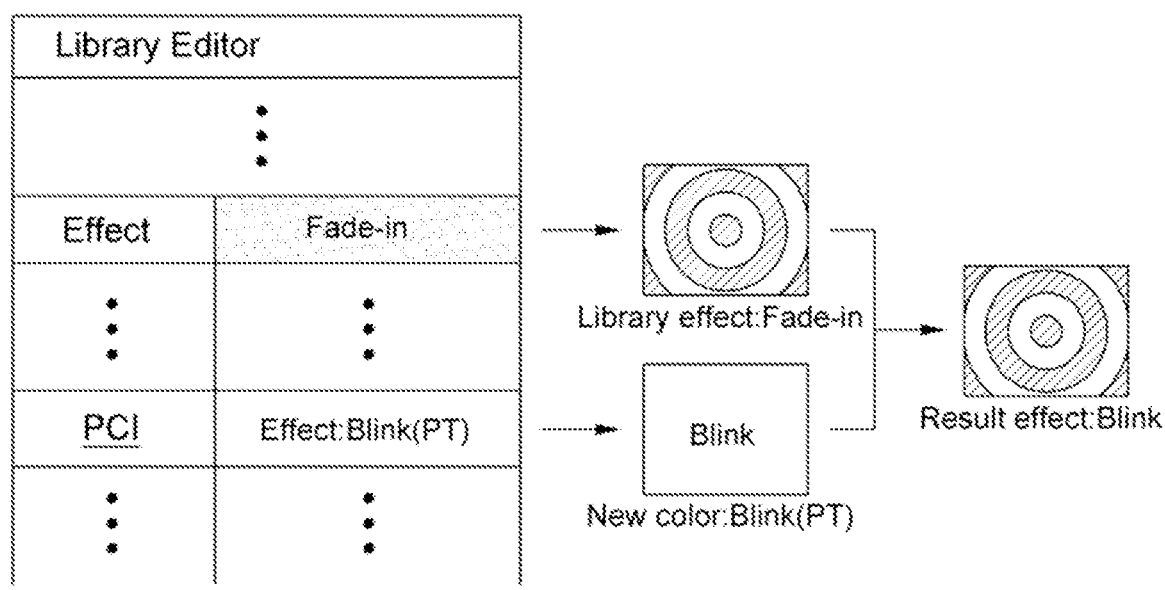

For example, the property conversion input PT may include a light emitting brightness conversion input for replacing the existing light emitting brightness (for example, first brightness) with the new light emitting brightness (for example, second brightness), For example, the property conversion input PT may include a dynamic effect conversion input for completely replacing the existing dynamic effect (for example, blink effect) with the new dynamic effect (for example, fade-in effect) as illustrated in FIG. 7.

Meanwhile, the property transformation input PR according to the embodiment of the present invention may mean an instruction input for changing the existing setting values of at least one parameter of the light emitting color, brightness, and/or dynamic effect corresponding to the property change section (PCS) to a combined value of the existing setting value and the new setting value based on a predetermined calculation.

Figure 8:
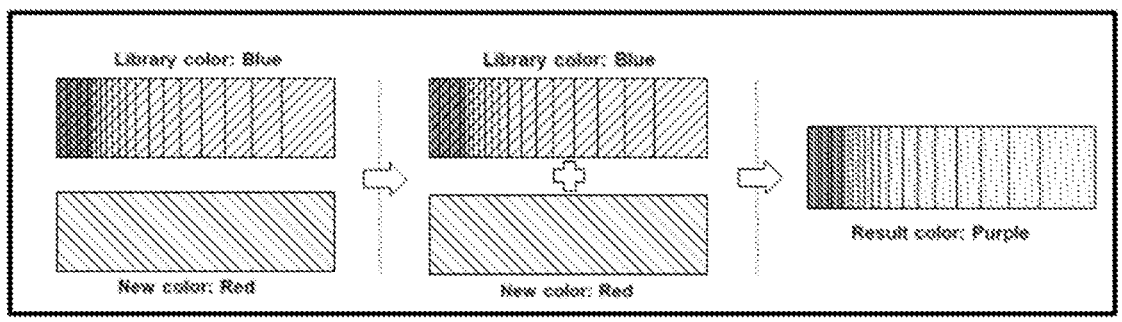
Figure 8:
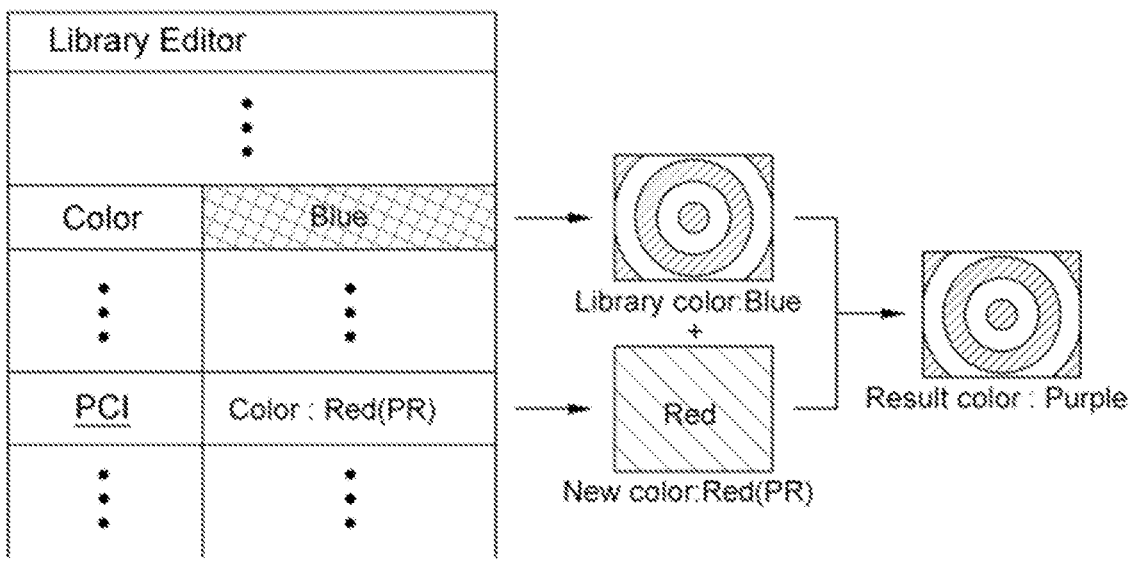

In an embodiment, as illustrated in FIG. 8, the property transformation input PR may include an light emitting color change input for changing the existing light emitting color (for example, blue) to a combined value (for example, purple) obtained by combining the existing light emitting color (for example, blue) and the new light emitting color (for example, red) based on a predetermined calculation (for example, addition calculation or the like).

In addition, the property transformation input PR may include an light emitting brightness change input for changing the existing light emitting brightness (for example, first brightness) to a combined value (for example, third brightness) obtained by combining the existing light emitting brightness (for example, first brightness) and the new light emitting brightness (for example, second brightness) based on a predetermined calculation (for example, addition calculation or the like).

Figure 9:
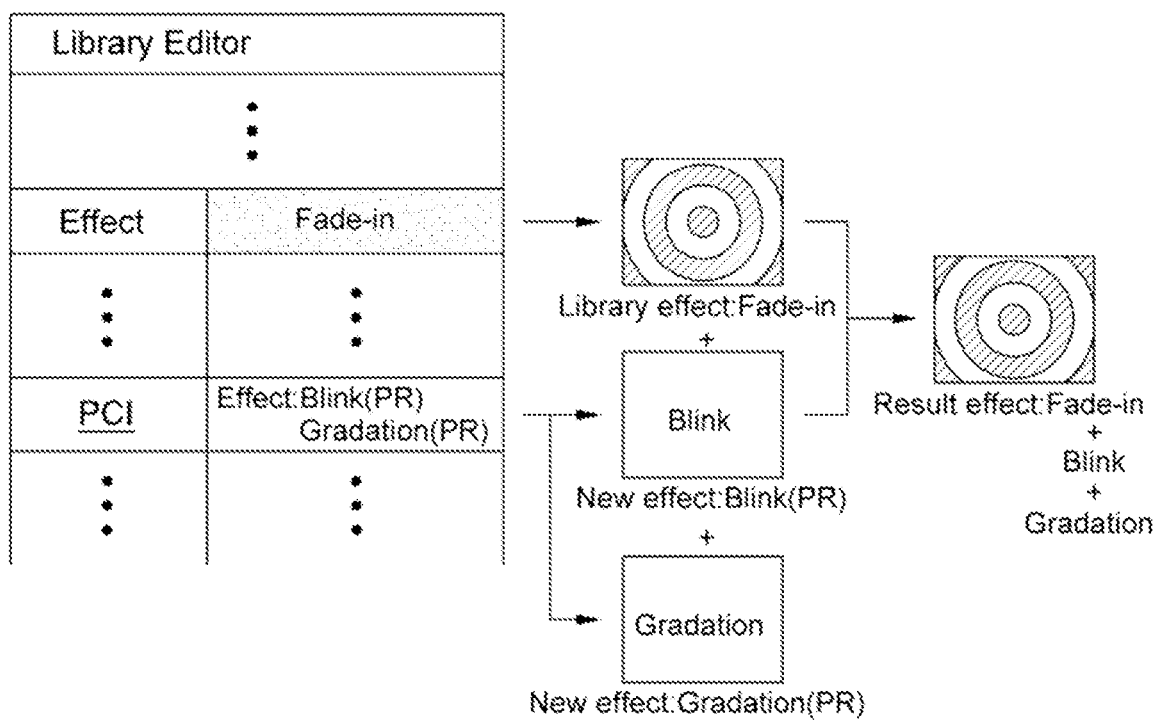

In addition, as illustrated in FIG. 9, the property transformation input PR may include a dynamic effect change input for changing the existing dynamic effect (for example, fade-in effect) to a combined value (for example, blink & fade-in effect & gradation) obtained by combining the existing dynamic effect (for example, fade-in effect) and the new dynamic color (for example, blink effect & gradation) based on a predetermined calculation (for example, addition calculation or the like).

In detail, in the embodiment, the directing application 111 may obtain the property transformation input PT and/or the property transformation input PR as described above for the set property change section (PCS) based on the input of the user (here, the director).

In addition, the directing application 111 may create the above-described property change information PCI by matching the obtained property transformation input PT and/or the property transformation input PR to the property change section PCS corresponding thereto.

Figure 10:
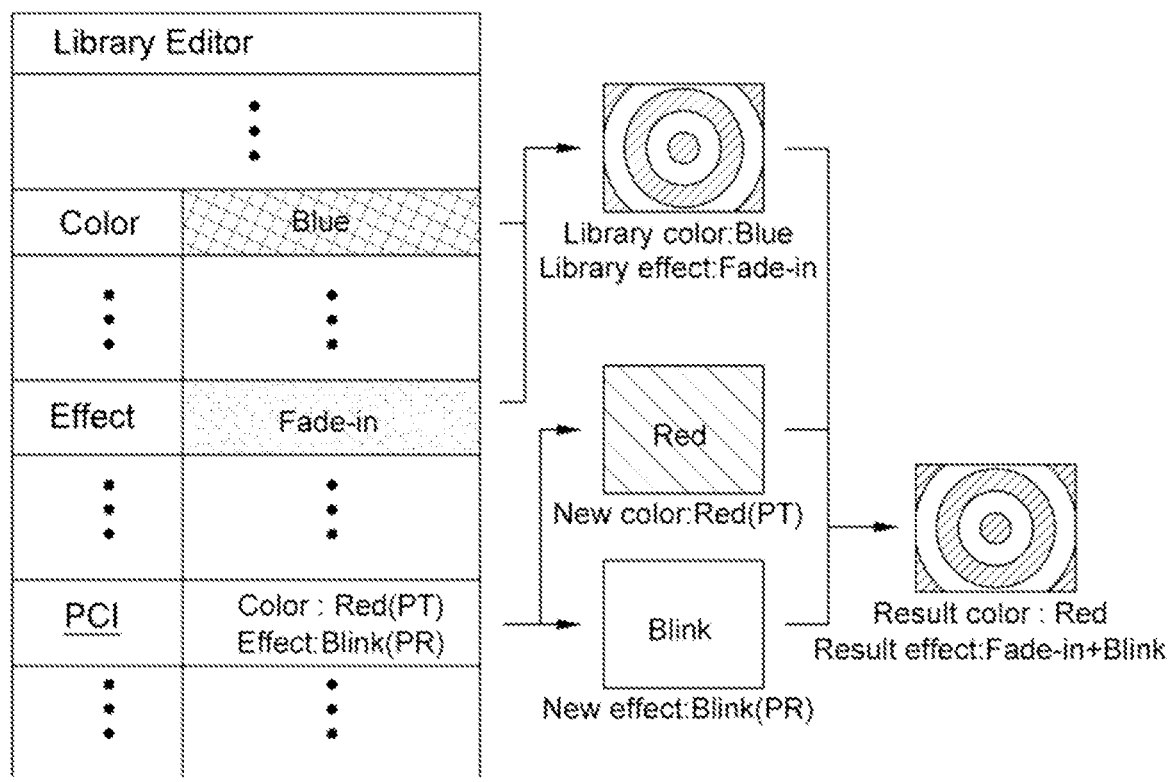

For example, referring to FIG. 10, the directing application 111 may create the property change information PCI for the first library based on a light emitting color transformation input for combining the existing light emitting color corresponding to the first property change section PCS with the new light emitting color, and a dynamic effect transformation input for combining the existing dynamic effect corresponding to the first property change section PCS with the new dynamic effect.

In addition, the directing application 111 may change the corresponding library by further including the property change information (PCI) created as above.

Thus, in the embodiment, the directing application 111 may control light emitting of the lighting device 300 according to the light emitting pattern information to which the property change information PCI is reflected (that is, the light emitting pattern information in which the light emitting pattern setting value is changed according to the corresponding property change information PCI) based on the library including the property change information PCI later.

In this way, the directing application 111 may create the property change information PCI for changing the light emitting pattern setting value for at least a part of the predetermined section to which the light emitting pattern information of the library created in advance is applied, and may perform the light emitting operation of the lighting device 300 based on the library according to the light emitting pattern setting value changed by the reflection of the created property change information PCI. As such, the directing application 111 can support easy and fast production of a separate new library by reusing the existing library without newly producing the separate new library from start to finish. Furthermore, the directing application 111 can realize a data saving effect by supporting library reuse and implementing a more diverse light emitting pattern production with a few libraries.

Meanwhile, according to the embodiment, the directing application 111 may provide an execution section setting function for the created library.

In general, in the case of a library that cannot be partially used and should be completely reproduced unconditionally, one library should be created according to the minimum time unit to increase reusability. In this case, there may be a situation in which as many libraries have to be produced.

In order to prevent this, in an embodiment of the present invention, the directing application 111 may provide the execution section setting function capable of executing the created library from a predetermined start time to a predetermined end time.

In detail, in the embodiment, the directing application 111 may set a start time and end time (hereinafter, referred to as a library start-end time) for the library based on the input of the user (here, the director).

In addition, the directing application 111 may store and manage the set library start-end time information by matching the library start-end time with the corresponding library.

In addition, in the directing application 111, when the library is read and executed, the light emitting control according to the library based on the set library start-end time can be performed.

That is, in the directing application 111, the light emitting control according to the library can be operated only for the execution section corresponding to the set library start time (for example, the first time) to the set library end time (for example, the second time after the first time).

In this way, the directing application 111 may provide an execution section setting process that supports to cut and use only the necessary execution section in the library. Accordingly, the directing application 111 can conveniently produce a library of a desired length without restrictions such as having to produce a library in every predetermined small time interval in order to increase usability of the library, and can also improve convenience when the library is reused.

Meanwhile, according to the embodiment, the directing application 111 may provide a library grouping function capable of storing and managing the created library in a group unit.

In detail, the directing application 111 may provide a library grouping function capable of grouping a plurality of library combinations to store and manage them.

In more detail, the directing application 111 may obtain library selection information for selecting at least two or more libraries among the plurality of libraries created in advance based on the input of the user (here, director).

In addition, the directing application 111 may obtain library combination information identifying the selected at least two or more libraries being sequentially listed according to the input of the user (here, director).

In addition, the directing application 111 may group at least two or more libraries corresponding to the obtained library combination information.

In addition, the directing application 111 may allow at least two or more libraries in the grouped library (hereinafter, referred to as a library group) to be continuously executed according to the listed order.

For example, when the library group includes the "first library-second library", the directing application 111 may be configured to execute the first library first and to run the second library in a second order.

That is, the directing application 111 may execute or reuse the library in units of a predetermined library group.

Accordingly, in the directing application 111, once the library combination that is frequently used repeatedly is grouped and stored, the library combination can be read and executed or reused later whenever it is to be used without specifying the library combination again.

Therefore, the directing application 111 can reduce the time or cost required to create the library combination.

In addition, in an embodiment of the present invention, the directing application 111 may create a scenario (S103).

The scenario according to the embodiment of the present invention is data preset in advance so that the lighting device 300 operates according to a specific light emitting pattern for a predetermined period of time, and may include scenario identification information and light emitting pattern information.

Hereinafter, descriptions overlapping those described in the above-described library creation step may be summarized or omitted.

In detail, the scenario may include the scenario identification information (for example, an identification number and/or a scenario name, or the like) for specifying the corresponding scenario, and the light emitting pattern information providing a specific light emitting pattern associated with the corresponding scenario.

FIG. 11 is an example of a diagram for explaining a scenario creation method according to an embodiment of the present invention.

Referring to FIG. 11, the light emitting pattern information (hereinafter, referred to as a scenario pattern information) of the scenario may be implemented based on 1) a combination of at least one library, 2) the combination of at least one library and a scenario self-light emitting pattern information (SPI), or 3) the scenario self-light emitting pattern information (SPI).

In more detail, the directing application 111 may 1) create the scenario based on the combination of at least one library.

That is, the scenario may be data in which the operation time for at least one library (hereinafter, referred to as a unit library) selected as a component of the scenario for a predetermined time is set.

Specifically, the directing application 111 may obtain the input of the user (here, director) for selecting at least one unit library.

In addition, the directing application 111 may obtain unit library combination information in which the selected at least one unit library is sequentially listed according to the input of the user (here, director).

In addition, the directing application 111 may set the operation time for each unit library listed above based on the input of the user (here, director).

In the embodiment, the directing application 111 may set the operation time by matching each of the unit libraries with each of at least some sections within a predetermined time during which the scenario is executed according to the input of the user (here, the director).

In addition, the directing application 111 may create the scenario by grouping the at least one unit library based on the library combination information obtained.

In addition, the directing application 111 may allow at least one unit library in the grouped unit library (hereinafter, referred to as a unit library group) to be continuously executed according to the listed order and operation time.

For example, when the directing application 111 creates a first scenario based on the first to the third unit libraries, the first light emitting pattern according to the first unit library for the first 5 seconds of the first scenario being executed may be operated, and then the second light emitting pattern according to the second unit library may be operated for 3 seconds, and then the light emitting pattern according to the third unit library may be operated for the last 2 seconds.

That is, the directing application 111 may set the light emitting pattern information according to the order of at least one unit library in the scenario and the operation time as the scenario pattern information for the corresponding scenario.

Thus, the directing application 111 may create a scenario which controls the light emitting pattern of the lighting device 300 for a predetermined time according to the scenario pattern information.

In this way, the directing application 111 creates one scenario by combining at least one library that has already been created, and thus, it is possible to reuse libraries having various light emitting patterns without extra effort and easily and quickly construct the scenario that directs a series of light emitting patterns executed for a predetermined period of time.

In addition, the directing application 111 may create the scenario based on 2) the combination of at least one library and the scenario self-light emitting pattern information (SPI).

That is, the operation time of at least one unit library may be set for at least some sections of a predetermined time, and the scenario self-light emitting pattern information (SPI) may be set for the remaining sections. Hereinafter, descriptions overlapping with the above description may be summarized or omitted.

In other words, the scenario may comprise a reuse section configured to be implemented based on the combination of at least one unit library as described above for a predetermined time during the scenario being executed, and may comprise a customizing section configured to be implemented based on the scenario self-light emitting pattern information (SPI) in the remaining time.

The scenario self-light emitting pattern information SPI according to the embodiment may mean light emitting pattern information newly set according to the input of the user (here, director) of the corresponding scenario during the process of creating a scenario.

In detail, the directing application 111 may set the scenario pattern information for the reuse section of the scenario based on the combination of at least one unit library described above.

In addition, the directing application 111 may obtain the input of the user (here, director) for specifying a specific light emitting pattern to be operated during the remaining customizing section other than the reuse section.

Here, a method of specifying the specific light emitting pattern may use the method for creating the library described in the library creation step described above, and thus, the content overlapping with the above description may be summarized or omitted.

Moreover, the directing application 111 may set the specified light emitting pattern as the self-pattern information (SPI), and set the set self-pattern information (SPI) as the scenario pattern information for the customizing section of the scenario.

That is, the directing application 111 may set the scenario pattern information of the reuse section in the corresponding scenario using the light emitting pattern information based on at least one unit library, and the scenario pattern information of the customizing section according to the self-pattern information (SPI) newly created by the user.

Thus, the directing application 111 may create the scenario in which the light emitting pattern of the lighting device 300 is controlled for a predetermined time according to the scenario pattern information.

In this way, the directing application 111 can support not only reusing the existing library, but also allowing the user (here, the director) to freely configure some sections of the scenario according to the user's desired light emitting pattern reflecting the needs of the user. Accordingly, the directing application 111 can provide a high degree of freedom to the scenario creation process and make a light emitting pattern specialized for each scenario included, and thus, it is possible to realize more various performance directing based on the lighting device 300.

In this case, according to the embodiment, the directing application 111 may store and manage the self-pattern information (SPI) as a single library.

In detail, the directing application 111 may provide the library identification information with respect to the self-pattern information (SPI), and store and operate the self-pattern information (SPI) associated with the library identification information as a single library.

Therefore, the directing application 111 can support the easy creation of the library during the process of creating a scenario to make the library be utilized easily later.

In addition, the directing application 111 may create the scenario based on 3) the self-pattern information (SPI).

That is, the scenario may be data which sets self-pattern information (SPI) to be operated for a predetermined time. Hereinafter, descriptions overlapping with the above description may be summarized or omitted.

In detail, the directing application 111 may acquire the self-pattern information (SPI) for specifying a specific light emitting pattern to be operated for the entire time of the scenario being executed based on the input of the user (here, director).

Moreover, the directing application 111 may set the acquired self-pattern information (SPI) as the scenario pattern information for the corresponding scenario.

Thus, the directing application 111 may create the scenario which controls the light emitting pattern of the lighting device 300 for a predetermined time according to the scenario pattern information.

Accordingly, the directing application 111 may enable the entire scenario to be executed according to the light emitting pattern desired by the user (here, director).

Meanwhile, referring further to FIG. 11, the directing application 111 may set property change information (PCI) for each unit library when creating the scenario comprising at least one unit library.

In other words, the property change information (PCI) may be the information for changing the light emitting pattern setting value of each parameter (e.g., turning on/off, color, brightness and/or dynamic effect of the lighting device) for a predetermined section with respect to the light emitting pattern information of the library that is created in advance.

That is, in the process of creating the scenario in the same way as the method of creating the property change information (PCI) described in the library creation step described above, the directing application 111 may set the property change information (PCI) for each unit library. For a detailed description of this, the description of the property change information (PCI) in the library creation step is applied.

Therefore, the directing application 111 can easily create various types of scenarios with a low cost through reuse of an existing library even when creating a new scenario.

In addition, the directing application 111 may implement the execution section setting function and library grouping function based on each unit library in the same way as the execution section setting function and library grouping function described in the library creation step described above. A detailed description thereof is replaced with a description of the execution section setting function and the library grouping function in the library creation step.

Meanwhile, the directing application 111 may create the scenario including a seat-specific scenario.

The seat-specific scenario according to the embodiment may mean a scenario in which the scenario identification information corresponding to each seat where the lighting device 300 is to be arranged in a predetermined space (e.g., a performance hall, or the like) is the same, but the scenario pattern information according to the scenario is different from each other.

That is, the directing application 111 may create a scenario including a seat-specific scenario that controls the lighting device 300 to operate with a different light emitting pattern depending on the position of the seat where the lighting device 300 is placed.

For example, the directing application 111 may create a first scenario including the seat-specific scenario which is a first scenario-first seat-first scenario pattern information and a first scenario-second seat-second scenario pattern information.

That is, the directing application 111 may create the first scenario based on the seat-specific scenario in which the light emitting pattern setting value of the first scenario executed on the lighting device 300 which is placed on the first seat and the light emitting pattern setting value of the first scenario executed on the lighting device 300 arranged on the second seat are assigned differently from each other.

Accordingly, the directing application 111 causes the lighting device 300 placed in each seat to collectively operate with different light emitting patterns when the first scenario set with different light emitting patterns for each seat is executed at the same time, and thus, can implement the integrated lighting control performance by multiple lighting devices 300 in the corresponding space.

That is, in the embodiment, the directing application 111 may implement the integrated lighting control performance which directs the different lighting devices 300 to operate collectively with the light emitting pattern specialized for the lighting devices associated with a specific seat to produce a specific shape as a whole, based on the above-mentioned seat-specific scenario.

Accordingly, the directing application 111 may control the lighting device 300 arranged for a number of seats in the performance hall to perform the light emitting operation specialized for each seat. In addition, through this, the directing application 111 can express a specific shape planned by the director using the light output from the plurality of lighting devices 300 for each seat.

In addition, the directing application 111 may create performance preparation data (S105).

Here, the performance preparation data according to the embodiment means data which defines various light emitting patterns for each seat where the lighting device 300 is arranged for the above-described integrated lighting control performance in advance and may mean data to be stored in advance in the lighting device 300 before the performance starts.

In detail, the directing application 111 may create the performance preparation data including at least one library and/or scenario created as described above.

According to the embodiment, the directing application 111 may create different performance preparation data for each seat.

In addition, the directing application 111 may distribute the performance preparation data (S107).

In detail, the directing application 111 may distribute the performance preparation data to the plurality of lighting devices 300 in connection with the central server 200 and/or the cheering stick terminal 100-2.

In more detail, the directing application 111 may transmit the created performance preparation data to the central server 200.

Then, the central server 200 may transmit the received performance preparation data to the plurality of cheering stick terminals 100-2.

In this case, each of the plurality of cheering stick terminals 100-2 may be linked 1:1 with each of the plurality of lighting devices 300.

In the embodiment, each of the plurality of cheering stick terminals 100-2 may be mapped 1:1 with each of the plurality of lighting devices 300 based on a terminal identification code for specifying each of the plurality of cheering stick terminals 100-2 and a device identification code for specifying each of the plurality of lighting devices 300, and thus, may be operated in pair.

Thus, the plurality of cheering stick terminals 100-2 may provide the performance preparation data received from the central server 200 to the lighting device 300 associated with each cheering stick terminal 100-2.

The plurality of cheering stick terminals 100-2 may provide the performance preparation data to the lighting devices 300 matched to the respective cheering stick terminals 100-2 based on a Bluetooth pairing method, or the like.

Accordingly, the plurality of lighting devices 300 may receive, store, and manage performance preparation data corresponding to seats in which each lighting device 300 is to be placed.

In another embodiment, when seat information corresponding to the lighting device 300 is input through a separate kiosk installed in a performance hall, the kiosk may provide performance preparation data for the corresponding seat through short-distance communication.

Figure 12:
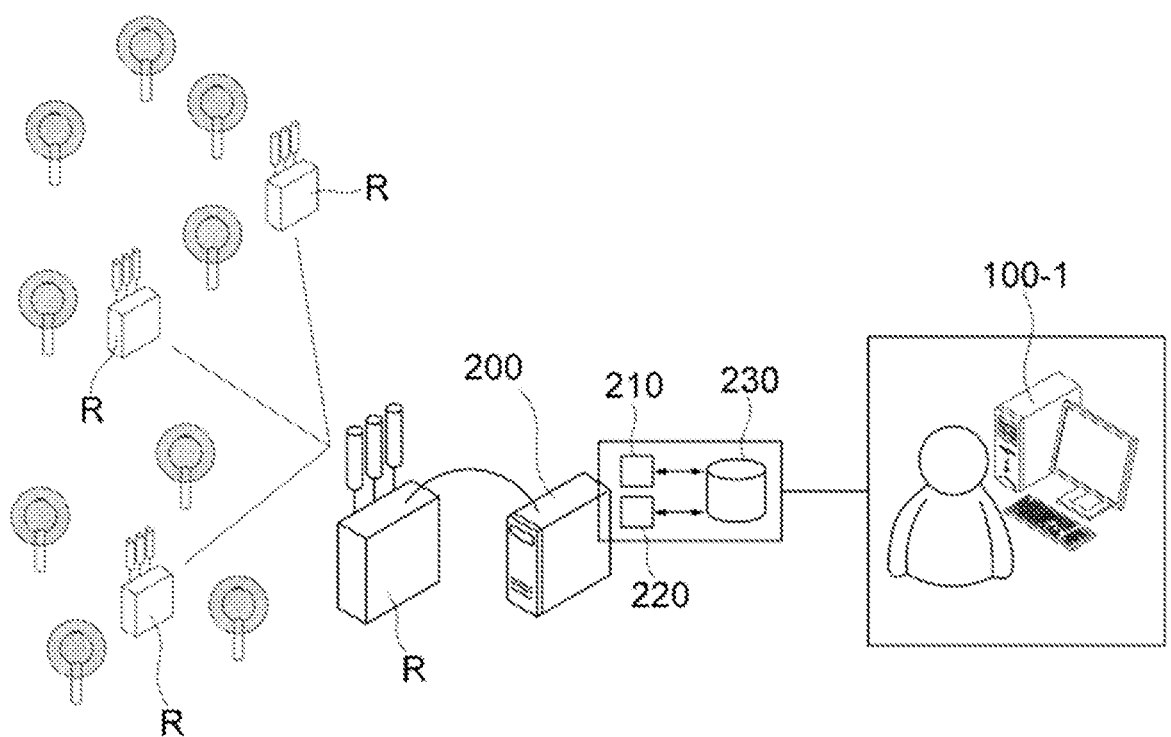
FIG. 12 is an example of a diagram for explaining a method of transmitting a lighting device control signal according to one embodiment of the present invention.

FIG. 12 is an example of a diagram for explaining a method of transmitting a lighting device control signal according to one embodiment of the present disclosure.

In addition, referring to FIG. 12, the directing application 111 may transmit the lighting device control signal and implement the integrated lighting control performance (S109).

Here, the lighting device control signal (hereinafter, referred to as a control signal) according to the embodiment may mean a signal for instructing execution/suspension/termination of at least one library and/or scenario included in the performance preparation data stored in the lighting device 300.

Figure 13:
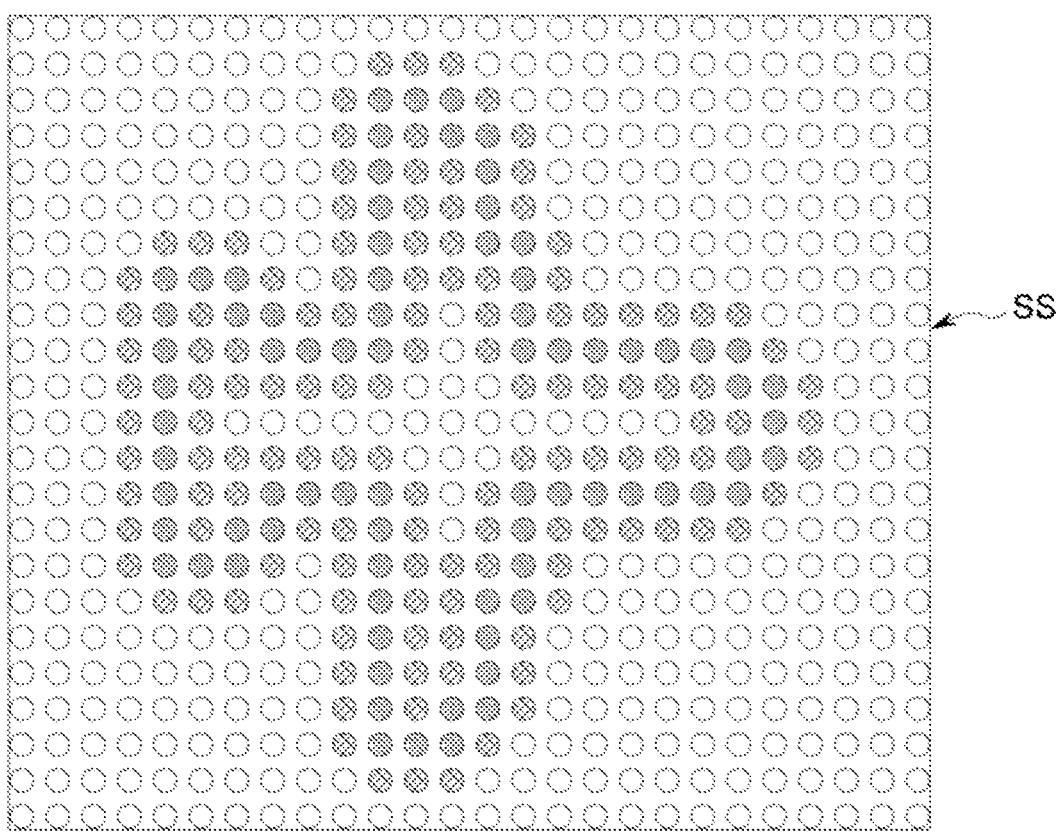
FIG. 13 is an example of a specific shape designed for integrated lighting control performance according to one embodiment of the present invention.

FIG. 13 is an example of a specific shape designed for the integrated lighting control performance according to an embodiment of the present invention.

In other words, the integrated lighting control performance according to the embodiment means a performance directing method which directs the different lighting devices 300 to collectively operate with an light emitting pattern specialized for the lighting devices to form a specific overall shape (SS: for example, bird shape as illustrated in FIG. 13).

In detail, the directing application 111 may provide the control signal according to the planned integrated lighting control performance to the plurality of lighting devices 300 in cooperation with the central server 200.

In more detail, the directing application 111 may transmit the control signal to the central server 200.

Then, the central server 200 may transmit the received control signal to the plurality of lighting devices 300 in a broadcasting method in connection with at least one or more repeaters R.

For reference, when using a unicast method instead of the broadcasting method, the central server 200 should transmit a data packet (in the embodiment, control signal) to be transmitted to a plurality of receivers (in the embodiment, the plurality of lighting devices 300) multiple times, and thus, network efficiency would be decreased due to redundant transmission of the same packet. In addition, when using the unicast method instead of the broadcasting method, the central server 200 should receive an ack message corresponding to the reception of the transmitted data packet (in the embodiment, control signal) from each of the plurality of receivers (in the embodiment, the lighting devices 300), and thus, smooth data communication may be inhibited due to likelihood of the deterioration of the communication situation.

Therefore, in the embodiment of the present invention, the central server 200 may transmit the control signal to the plurality of lighting devices 300 using a one-to-many communication broadcasting method in which the data packet (in the embodiment, control signal) is transmitted without specifying a separate recipient for the entire network which a host of the network controls by interworking with the repeater R.

That is, the central server 200 transmits the control signal to the plurality of lighting devices 300 based on the broadcasting method, thereby minimizing the omission of the control signal communication minimizing a communication sync error between the plurality of lighting devices 300 and improving communication efficiency can be achieved.

Subsequently, the plurality of lighting devices 300 receiving the control signal from the central server 200 may perform the light emitting control according to the received control signal.

In detail, the plurality of lighting devices 300 may perform the light emitting control according to the control signal by controlling the light source unit 360 of each lighting device 300 according to the light emitting pattern based on the received control signal. A detailed description of this will be described in the performance production method based on the control of the lighting device 300 to be described later.

Accordingly, the directing application 111 according to the embodiment of the present invention may implement the integrated lighting control performance according to the control signal.

That is, the directing application 111 may store the performance preparation data including at least one library and/or a scenario for each of the plurality of lighting devices 300.

Thereafter, the directing application 111 may transmit the control signal instructing the execution/suspension/termination of at least one of the library and/or scenario to the plurality of lighting devices 300 in a broadcasting method. Accordingly, the directing application 111 may cause the plurality of lighting devices 300 to collectively perform the light emitting operation according to the light emitting pattern of a predetermined library and/or scenario according to the corresponding control signal.

Through this, the directing application 111 can easily operate the plurality of lighting devices 300 with different light emitting patterns simply by sending a single control signal to the plurality of lighting devices 300.

Performance production method based on lighting device control

Hereinafter, a method for the lighting device control system 1000 according to an embodiment of the present invention to perform the performance directing based on the control of the lighting device 300 will be described in detail with reference to the accompanying drawings.

In this case, descriptions overlapping with those described in the above-described lighting device control method may be summarized or omitted.

Figure 14:
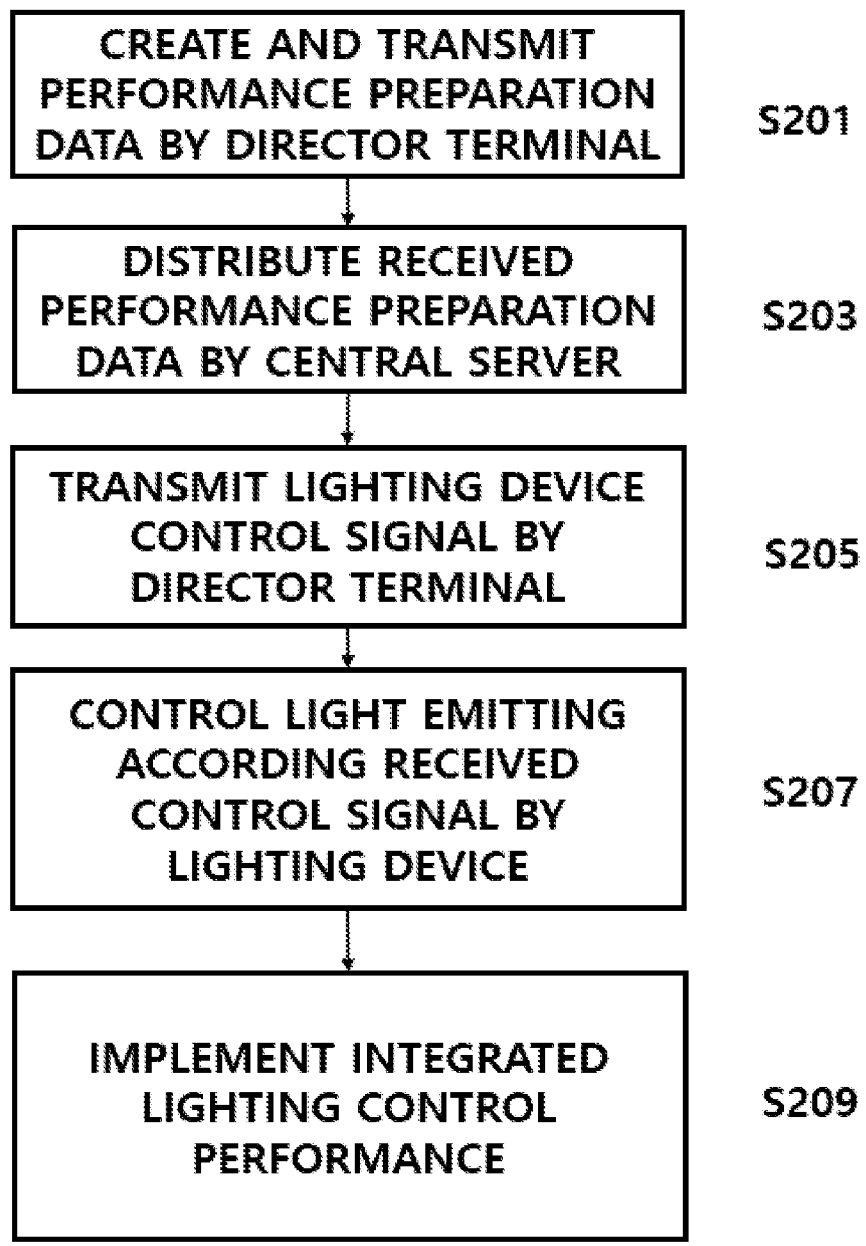
FIG. 14 is a flowchart illustrating a performance directing method based on a control of a lighting device control according to one embodiment of the present invention.

FIG. 14 is a flowchart for explaining the performance directing method based on the control of the lighting device 300 according to an embodiment of the present invention.

Referring to FIG. 14, the director terminal 100-1 of the lighting device control system 1000 according to the embodiment of the present invention may create and transmit performance preparation data (S201).

Here, in other words, the performance preparation data according to the embodiment means data which defines various light emitting patterns for each seat where the lighting device 300 is disposed for the integrated lighting control performance according to the embodiment of the present invention and may mean data to be stored in advance in the lighting device 300 before the performance starts.

In detail, in the embodiment, the director terminal 100-1 may create the performance preparation data including at least one library and/or scenario created as described above.

In addition, the director terminal 100-1 may transmit the created performance preparation data to the central server 200.

In addition, the central server 200 of the lighting device control system 1000 may distribute the received performance preparation data (S203).

In detail, the central server 200 may distribute the performance preparation data received from the director terminal 100-1 to the plurality of lighting devices 300 in connection with the cheering stick terminal 100-2 of the lighting device control system 1000.

In more detail, the central server 200 may transmit the received performance preparation data to the plurality of cheering stick terminals 100-2.

In this case, each of the plurality of cheering stick terminals 100-2 may be linked 1:1 with each of the plurality of lighting devices 300.

Each of the plurality of cheering stick terminals 100-2 may be mapped 1:1 with each of the plurality of lighting devices 300 based on the terminal identification code for specifying each of the plurality of cheering stick terminals 100-2 and the device identification code for specifying each of the plurality of lighting devices 300, and thus, may be operated in pair.

Thus, the plurality of cheering stick terminals 100-2 may provide the performance preparation data received from the central server 200 to the lighting device 300 matched to each of the plurality of cheering stick terminals 100-2.

Here the plurality of cheering stick terminals 100-2 may provide the performance preparation data to the lighting devices 300 matched to the respective cheering stick terminals 100-2 based on a Bluetooth pairing method, or the like.

Accordingly, the plurality of lighting devices 300 may receive, store, and manage the performance preparation data corresponding to seats in which each lighting device 300 is to be placed.

Moreover, the director terminal 100-1 of the lighting device control system 1000 may transmit the control signal (S205).

In detail, the director terminal 100-1 may transmit the control signal as described above to the plurality of lighting devices 300 in connection with the central server 200 of the lighting device control system 1000.

Here, in other words, the control signal according to the embodiment may mean a signal for instructing execution/suspension/termination of at least one library and/or scenario included in the performance preparation data stored in the lighting device 300.

In more detail, the director terminal 100-1 may transmit the control signal to the central server 200.

Then, the central server 200 may transmit the received control signal to the plurality of lighting devices 300 in a broadcasting method in connection with at least one or more repeaters R.

Accordingly, the central server 200 can easily and quickly transmit a common control signal to a plurality of lighting devices 300 and minimize the accompanying communication load.

In addition, the lighting device 300 of the lighting device control system 1000 may perform the light emitting control according to the received control signal (S207).

In detail, the lighting device 300 may perform the light emitting control according to a control signal received from the central server 200.

In more detail, the plurality of lighting devices 300 may perform the light emitting control according to the control signal by controlling the light source unit 360 of each lighting device 300 according to the light emitting pattern based on the received control signal.

Specifically, the lighting device 300 may detect a library and/or scenario matching the received control signal based on the performance preparation data stored in the storage unit 320.

For example, the lighting device 300 may read the first library in the performance preparation data stored in the storage unit 320 when the received first control signal is a first library execution signal. As another example, when the received second control signal is the first scenario execution signal, the lighting device 300 may read the first scenario in the performance preparation data stored in the storage unit 320.

Moreover, the lighting device 300 may control the light emitting operation of the light source unit 360 according to the light emitting pattern corresponding to the detected library and/or scenario.

In an embodiment, the lighting device 300 may control the light emitting operation of the light source unit 360 according to the detected light emitting pattern information of the library, and may control the light emitting operation of the light source unit 360 according to the scenario pattern information of the detected scenario.

For example, the lighting device 300 may control the light emitting operation of the light source unit 360 based on the setting values of the turning on/off, color, brightness, and/or dynamic effect of the lighting device according to the first light emitting pattern information (for example, "light emitting on/first color/first brightness/first dynamic effect", or the like) of the first library.

As another example, the lighting device 300 may control the light emitting operation of the light source unit 360 based on the setting values of the turning on/off, color, brightness, and/or dynamic effect of the lighting device according to the first scenario pattern information (for example, "first light emitting pattern information of first library/f color/second light emitting pattern information of second library/first self-pattern information (SPI)", or the like) of the first scenario.

The lighting device 300 may control the light emitting operation of the light source unit 360 according to the light emitting pattern defined by the property change information (PCI) for each of the detected library and/or the unit library in the scenario.

That is, the lighting device 300 may control the light emitting operation of the light source unit 360 according to the light emitting pattern information reflecting the property change information (PCI) of the detected library, and may control the light emitting operation of the light source unit 360 according to the scenario pattern information which reflects property change information (PCI) for each unit library in the detected scenario.

Accordingly, the lighting device 300 can support efficient implementation of various types of light emitting patterns according to the property change information (PCI) for each library.

In addition, the lighting device control system 1000 may implement an integrated lighting control performance (S209).

That is, as the plurality of lighting devices 300 collectively control the light emitting based on the predetermined control signal as described above, the lighting device control system 1000 according to the embodiment of the present invention can implement the integrated lighting control performance which directs the different lighting devices 300 to operate collectively with the light emitting patterns specialized for the lighting devices to produce a specific shape as a whole.

As described above, the lighting device control system 1000 according to an embodiment of the present invention stores the performance preparation data including at least one library and/or scenario in each of the plurality of lighting devices 300 in advance, and thereafter, provides the control signal instructing the execution/suspension/termination of at least one of the corresponding library and/or scenario to the plurality of light devices 300, interprets the provided control signal based on the performance preparation data stored in advance in each of the plurality of light devices 300, and collectively performs the light emitting operation of each of the plurality of light devices 300 according to the light emitting pattern of the predetermined library and/or scenario according to the corresponding control signal. Accordingly, the integrated lighting control performance in which the light emitting operations having different various forms should be collectively performed by each of the plurality of light devices 300 can be implemented through an efficient process in a smooth communication environment.

As described above, according to the lighting device 300 and the method and system for controlling the same according to an embodiment of the present invention, the library and/or scenario for controlling the light emitting of the lighting device 300 is created, and the light emitting control for a plurality of lighting devices 300 is performed based on the created library and/or scenario. Accordingly, it is possible to easily and conveniently execute the light emitting operations specialized for each of the plurality of lighting devices arranged and distributed for each number of seats in a performance hall with high accuracy.

In addition, according to the lighting device 300 and the method and system for controlling the same according to an embodiment of the present invention, it is possible to perform the light emitting control of the plurality of lighting devices 300 based on the library and/or scenario, and thus, it is possible to implement a performance directing method (i.e.g, integrated lighting control performance) in which different lighting devices collectively operate with the predetermined light emitting patterns for each of the lighting devices to produce a specific shape as a whole.

In addition, according to the lighting device 300 and the method and system for controlling the same according to an embodiment of the present invention, it is possible to support enhancement of reusability of the library and/or scenario. Accordingly, when a new library and/or scenario other than the existing library and/or scenario is required, the new library and/or the new scenario can be created by actively utilizing the library and/or scenario that has been produced without producing the new library and/or scenario from start to finish and adding only a predetermined change.

In addition, according to the lighting device 300 and the method and system for controlling the same according to an embodiment of the present invention, it is possible to support the creation of the new library and/or the new scenario easily and quickly by supporting the reuse of the library and/or scenario. Therefore, it is possible to reduce data and implement more various light emitting operation with a small quantity of library and/or scenario.

In addition, according to the lighting device 300 and the method and system for controlling the same according to an embodiment of the present invention, it is possible to provide efficiency and completeness of the performance directing method (i.e., integrated lighting control performance) in which different lighting devices 300 collectively operate with the predetermined light emitting patterns for each of the lighting devices to produce a specific shape as a whole.

Therefore, it is possible to reduce various efforts and costs required for the integrated lighting control performance and improve a degree of perfection.

In addition, according to the lighting device 300 and the method and system for controlling the same according to an embodiment of the present invention, it is possible to implement data communication between components in the lighting device control system 1000 based on the communication method optimized for the integrated lighting control performance.

Therefore, it is possible to minimize communication errors such as omission of control signal communication for lighting devices 300 or communication sync errors between multiple lighting devices 300, and to improve efficiency.

In addition, according to the lighting device 300 and the method and system for controlling the same according to an embodiment of the present invention, based on the optimized communication method, it is possible to easily implement light emitting operations based on the light emitting pattern pre-stored in each of the plurality of lighting devices 300 by simply transmitting a single low-capacity and fast control signal to the plurality of lighting devices 300.

Therefore, it is possible to provide a smooth communication environment by transmitting a common control signal to multiple lighting devices 300 easily and quickly and minimizing the communication load involved, and in such a smooth communication environment, the integrated lighting control performance as described above may be supported.

Meanwhile, the embodiments according to the present invention described above may be implemented in the form of program instructions that can be executed through various computer components and recorded in a computer-readable recording medium. The computer-readable recording medium may include program instructions, data files, data structures, or the like alone or in combination. The program instructions recorded on the computer-readable recording medium may be specially designed and configured for the present invention, or may be known and used by those skilled in the art of computer software. Examples of the computer-readable recording medium include hard disks, magnetic media such as floppy disks and magnetic tapes, optical recording media such as CD-ROMs and DVDs, magneto-optical media such as floppy disks, and hardware devices specially configured to store and execute program instructions such as ROM, RAM, flash memory, and the like. Examples of program instructions include not only machine language codes such as those created by a compiler, but also high-level language codes that can be executed by a computer using an interpreter or the like. A hardware device may be converted into one or more software modules to perform processing in accordance with the present disclosure, and vice versa.

The specific implementations described in the present invention are only examples, and do not limit the scope of the present invention in any way. For the clarity of the specification, descriptions of conventional electronic components, control systems, software, and other functional aspects of the systems may be omitted. In addition, the connections or connecting members of the lines between the components illustrated in the drawings exemplarily represent functional connections and/or physical or circuit connections, and in an actual device, it may be represented as a variety of alternative or additional functional connections, physical connections, or circuit connections. In addition, unless there is a specific reference such as "essential" or "importantly", it may not be a necessary component for the application of the present disclosure.

In addition, although the detailed description of the present invention described has been described with reference to the preferred embodiment of the present invention, those skilled in the art or those having ordinary knowledge in the art will be able to understand that present disclosure can be variously modified and changed within the scope without departing from the spirit and technical scope of the present disclosure described in claims to be described later. Accordingly, the technical scope of the present disclosure should not be limited to the contents described in the detailed description of the specification, but should be defined by the claims.

What is claimed is:

1. A method for controlling a lighting device among a plurality of lighting devices in which the lighting device is controlled by a directing application executed by at least one processor of a director terminal, the method comprising:
   creating a library which defines light emitting patterns for a plurality of lighting devices;
   creating a scenario which defines the light emitting patterns for the plurality of lighting devices for a predetermined time;
   creating a performance preparation data including the library and the scenario;
   providing the created performance preparation data to the plurality of lighting devices;
   transmitting, to the plurality of lighting devices, a lighting device control signal instructing execution, suspension, or termination of the library and the scenario included in the provided performance preparation data; and
   implementing an integrated lighting control performance according to the transmitted lighting device control signal, wherein
   the creating of the library comprises:
      modifying a predetermined library by setting library identification information for specifying the library; and
      modifying the predetermined library by setting a light emitting pattern information for specifying a parameter value of at least one of turning on/off, color, brightness, and dynamic effects of the lighting device, and the creating of the scenario comprises:
      modifying a predetermined scenario by setting a scenario identification information for specifying the scenario, wherein the predetermined scenario includes predetermined libraries or libraries created by modifying predetermined libraries; and
      modifying the predetermined scenario by setting a scenario pattern information for specifying a parameter value of at least one of turning on/off, color, brightness, and dynamic effects of the lighting device.

2. The method of claim 1, wherein the integrated lighting control performance is a performance directing method which directs the plurality of lighting devices to operate collectively in a light emitting pattern specified for each seat of a plurality of seats in which the plurality of lighting devices are placed, and makes the plurality of lighting devices emit lights to produce a unified shape as a whole.

3. The method of claim 1, wherein the setting the property change information comprises setting the property change information based on at least one of a property conversion input for replacing the parameter value with a new parameter setting value and a property transformation input for replacing the parameter value with a predetermined operation result value based on the parameter value and the new parameter setting value.

4. The method of claim 1, wherein the creating the library further comprises creating a seat-specific library which has the same library identification information assigned to each of the plurality of lighting devices being placed in predetermined seats and has the different light emitting pattern information between at least some of the plurality of lighting devices being placed in the predetermined seats.

5. The method of claim 1, wherein the creating the scenario further comprises setting the scenario pattern information based on the light emitting pattern information according to a combination of at least one library.

6. The method of claim 5, wherein the creating the scenario further comprises setting a property change information with respect to at least one of the libraries.

7. The method of claim 1, wherein the creating the scenario further comprises creating a seat-specific scenario which has the same scenario identification information assigned to each of the plurality of lighting devices being placed in predetermined seats and has the different scenario pattern information between at least some of the plurality of lighting devices being placed in the predetermined seats.

8. The method of claim 1, wherein the creating the library comprises setting an execution section for executing the library from a predetermined start time to a predetermined end time.

9. The method of claim 1, wherein the creating the library comprises providing a library grouping function for grouping, storing and managing a combination of the plurality of libraries.

10. The method of claim 1, wherein the transmitting the lighting device control signal to the plurality of lighting devices comprises transmitting the lighting device control signal including the same command to the plurality of lighting devices using a broadcasting method.

11. The method of claim 1, wherein the implementing the integrated lighting control performance is to make each of the plurality of lighting devices operate collectively in a predetermined light emission pattern to produce a unified shape as a whole.

12. A director terminal comprising:
   at least one memory configured to store a direction application; and
   at least one processor configured to execute the directing application of the memory,
   wherein the directing application is configured to:
   create a library including a plurality of seat-specific libraries which define light emitting patterns for each seat where a plurality of lighting devices is to be located; and
   create a scenario which makes the plurality of lighting devices perform an integrated lighting control performance production for a predetermined time based on the library, wherein
   the directing application is further configured to, in order to create the scenario, set the plurality of lighting devices to operate in accordance with a specific library included in the plurality of libraries for a predetermined time and set a property change information for changing a parameter value of light emitting pattern information of the specific library for the predetermined time,
   the creating of the library comprises:
      modifying a predetermined library by setting library identification information for specifying the library; and
      modifying the predetermined library by setting a light emitting pattern information for specifying a parameter value of at least one of turning on/off, color, brightness, and dynamic effects of the lighting device, and the creating of the scenario comprises:
      modifying a predetermined scenario by setting a scenario identification information for specifying the scenario, wherein the predetermined scenario includes predetermined libraries or libraries created by modifying predetermined libraries; and
      modifying the predetermined scenario by setting a scenario pattern information for specifying a parameter value of at least one of turning on/off, color, brightness, and dynamic effects of the lighting device.

* * * * *